US005658032A

United States Patent [19]
Gardner

[11] Patent Number: 5,658,032
[45] Date of Patent: Aug. 19, 1997

[54] EXPANDABLE STRUCTURE HAVING AN IMPROVED EXPANSION CHAMBER

[76] Inventor: Stewart Gardner, 17812 County Rd. 10, Bristol, Ind. 46507

[21] Appl. No.: 544,089

[22] Filed: Oct. 17, 1995

Related U.S. Application Data

[63] Continuation-in-part of Ser. No. 375,594, Jan. 19, 1995.
[51] Int. Cl.⁶ .................................................. B60P 3/34
[52] U.S. Cl. ........................ 296/26; 296/175; 296/176; 52/67
[58] Field of Search ........................ 296/26, 27, 165, 296/171, 172, 175, 176; 52/67

[56] References Cited

U.S. PATENT DOCUMENTS

| | | | |
|---|---|---|---|
| 2,886,856 | 5/1959 | Che | 296/171 |
| 2,913,775 | 11/1959 | Sailor | 296/172 |
| 2,965,412 | 12/1960 | Henderson et al. | 296/171 |
| 3,271,065 | 9/1966 | Scuris | 296/172 |
| 4,133,571 | 1/1979 | Fillios | 296/171 |
| 4,930,837 | 6/1990 | Marsh et al. | 296/26 |
| 5,154,469 | 10/1992 | Morrow | 296/26 |

FOREIGN PATENT DOCUMENTS

| | | | |
|---|---|---|---|
| 2001-589 | 2/1979 | United Kingdom | 296/26 |

Primary Examiner—Dean Kramer
Attorney, Agent, or Firm—Mark C. Jacobs

[57] ABSTRACT

A structure having an interior living space, an optional cab for operation of a propulsion system, and at least one expanding chamber. Each chamber is a box with one open wall. The structure may be a towable trailer, a recreational vehicle body on a truck chassis, or a motorized recreational vehicle, or a trailer with a support system instead of wheels for stationary use, or a fixed building on a foundation. The structure's living space is open at the interface with a respective expansion chamber. For use, a stowed chamber moves from within the structure, between its outer walls, to an expanded position external of the structure. A pair of cantilevered deployable rails are moved, prior in time to a chamber exodus, outwardly from beneath the structure to support the chamber to be expanded.

43 Claims, 15 Drawing Sheets

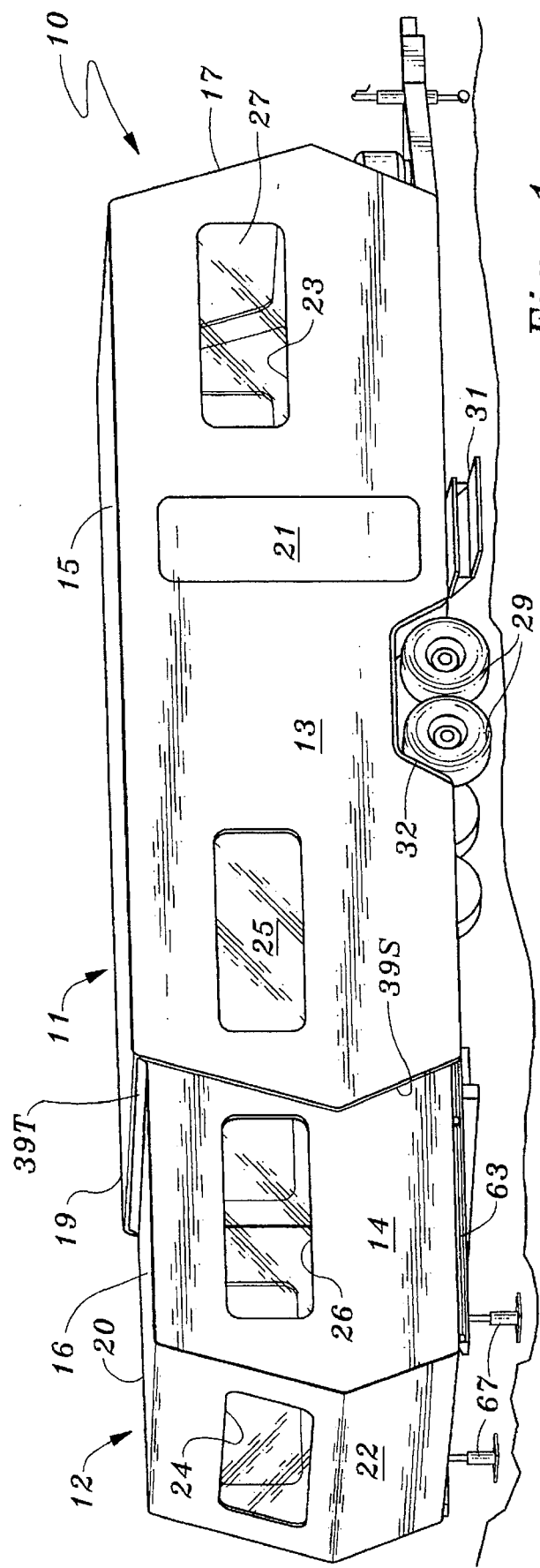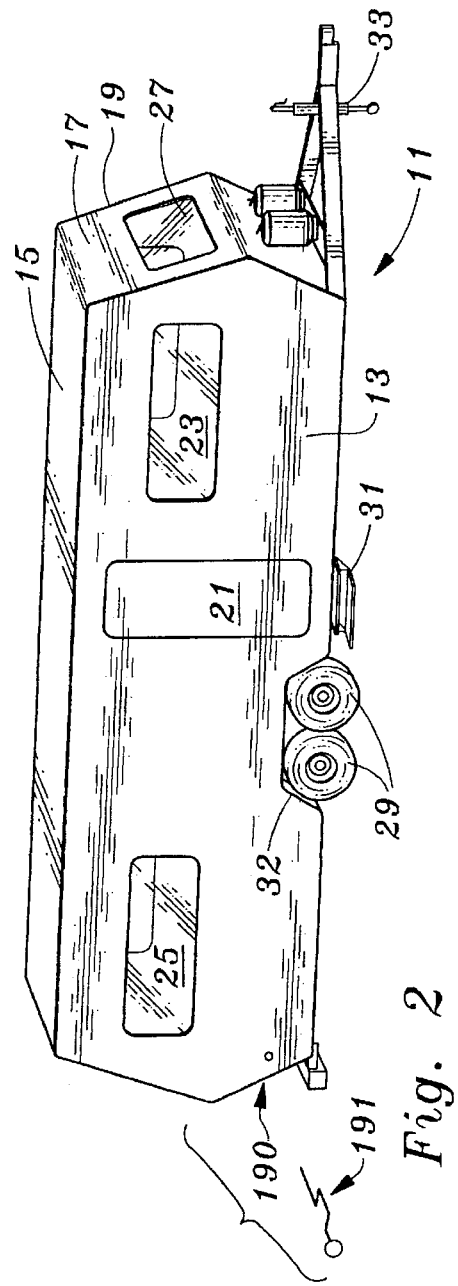

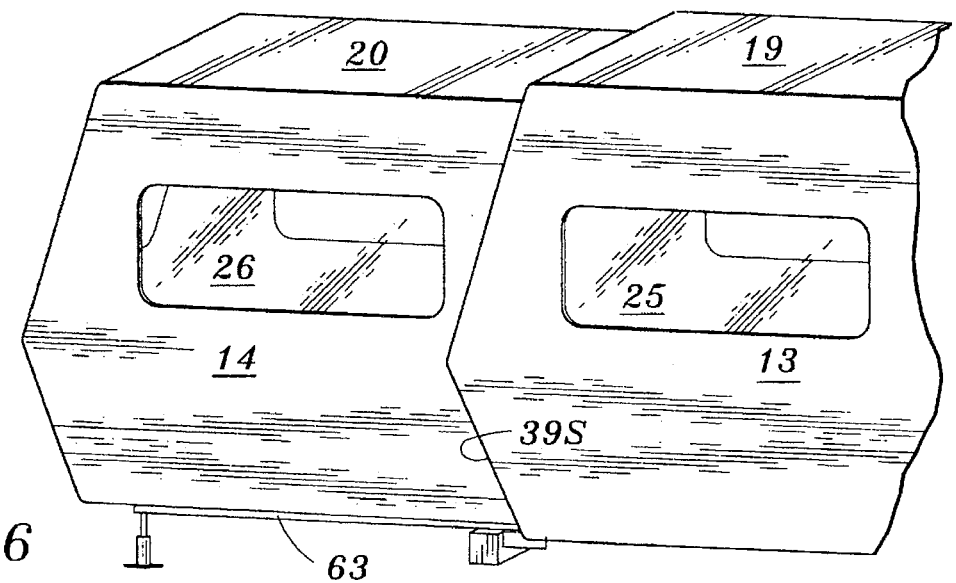
Fig. 6
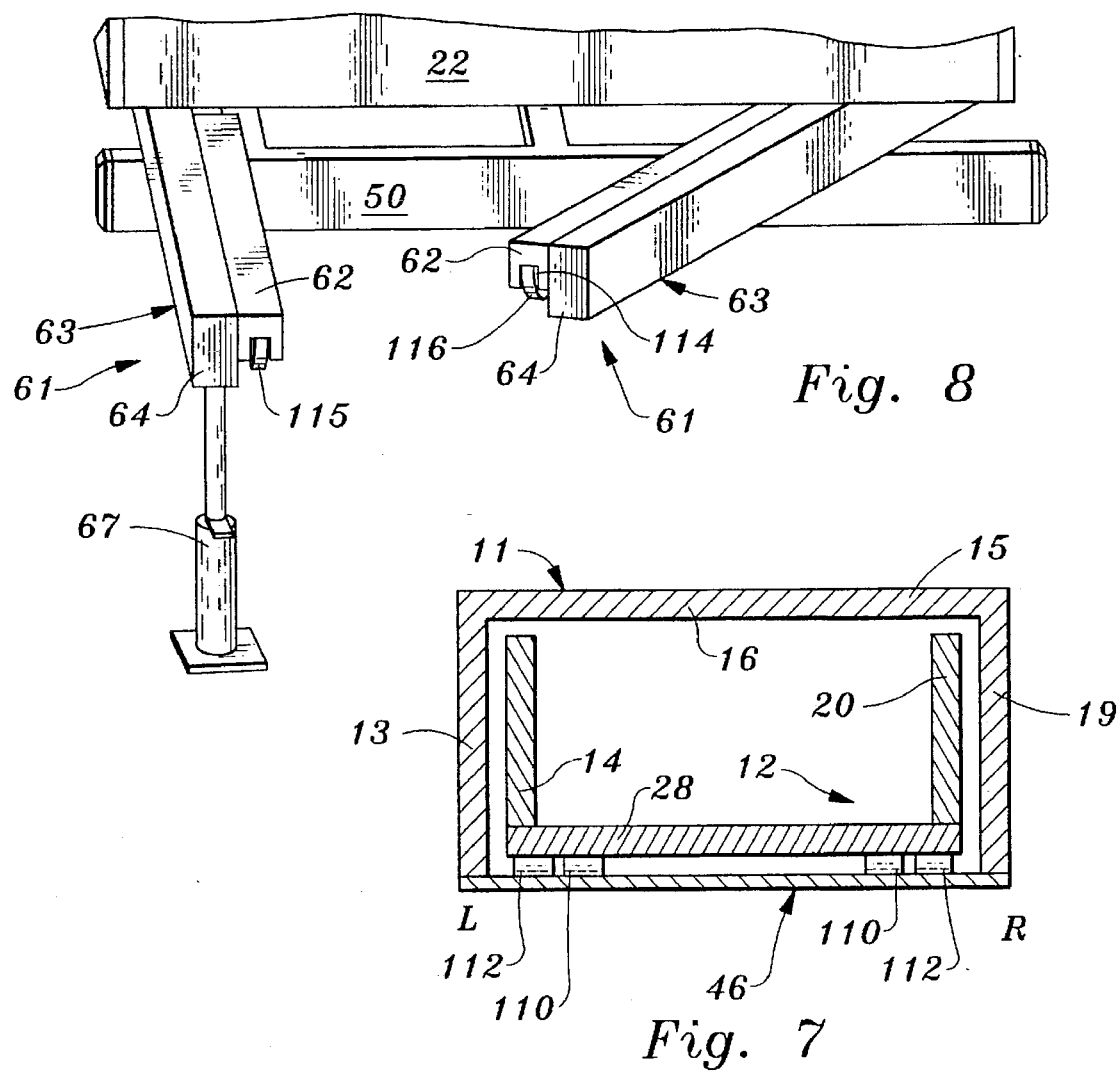
Fig. 8
Fig. 7

EXPANDABLE STRUCTURE HAVING AN IMPROVED EXPANSION CHAMBER

RELATIONSHIP TO OTHER APPLICATIONS

This application is a continuation-in-part of my application Ser. No. 08/375,594 filed Jan. 19, 1995 and now pending.

FIELD OF THE INVENTION

This invention relates to recreational vehicle coaches, both motorized and towable, and other habitat bodies having a fixed cubic capacity, and which are expandable to an enlarged cubic capacity.

BACKGROUND OF THE INVENTION

Marketing research has shown that persons who own motor coaches want more usable living space in their coaches when they arrive at a destination, yet they want to be able to travel in a more compact coach which latter is safer and easier to maneuver. In various RV vehicles attempts have been made over the years to increase the living space available to the occupants. We are all familiar with the pop-top campers offered in the past and still today by Volkswagen GMBH.

Recently attempts have been made to increase the living space available for use. Several manufacturers are now offering coaches which have a small section that can move leftwardly outward from behind the driver. The chamber that is capable of moving is usually limited to no more than 4 feet in depth and from 6 to 8 feet in length. Those seen by applicant use a pair of hydraulic rams to move the chamber outwardly. Such units offer limited expansion volume and are not very reliable due to the difficulties associated with maintaining the alignment of the pair of parallel rams.

Due to his knowledge of the problems in defining an expandable coach, applicant invented a double wall main body coach from between which an expansion chamber could move outwardly either to the rear of a coach, and if no cab were present, an expansion chamber could move forwardly as well. That invention is disclosed and claimed in applicant's co-pending application, Ser. No. 375,594 filed Jan. 19, 1995.

As a result of the search carried out with respect to his earlier invention, applicant became aware of the following U.S. Patents:

| U.S. Pat. No. | Applicant | Issue Date |
| --- | --- | --- |
| 642,991 | Macfee | February 6, 1900 |
| 3,212,810 | Bass | October 19, 1965 |
| 3,740,088 | Ratcliff | June 19, 1973 |
| 3,833,954 | Daughenbaugh | September 10, 1974 |
| 3,915,492 | Agnese | October 28, 1975 |
| 4,017,116 | Hulsey | April 12, 1977 |
| 4,106,732 | Whiting | August 15, 1978 |
| 4,114,942 | Greiner | September 19, 1978 |
| 4,133,571 | Fillios | January 9, 1979 |
| 4,295,679 | Artweger | October 20, 1981 |
| 5,127,697 | St. Marie | July 7, 1992 |
| 5,154,469 | Morrow | October 13, 1992 |

The invention of the current patent application is neither disclosed in any of the above patents nor is the invention rendered obvious from any combination of these references.

Therefore, one object of this invention is to provide an improved coach having at least one expansion chamber.

It is another object to provide a coach having an expansion chamber that provides additional living space interiorly in the coach.

It is yet another object of this invention to provide a coach with an expansion chamber which when in the stowed position cannot be seen.

It is still another object to provide a coach with an expansion chamber that is supported by members associated with and carried by the coach.

It is a further object to provide a coach with an expansion chamber which is easier and cheaper to build than those of the prior art, and easier to install as well.

It is a still further object to provide a coach with an expansion chamber that can be easily moved from a stowed first position to an operative second position by a person who lacks a high degree of mechanical skill.

It is an additional object to provide a coach which can be expanded to provide additional living space, and which coach can be used unexpanded, either in a stationary supported position or as a moving vehicle.

It is yet another object to provide a coach or other habitat with an expansion chamber whose floor overlays the floor of the main body of the coach.

It is a yet further object to provide an expansion chamber for a coach, wherein a significant portion of the drive mechanism for moving the chamber from an inward to an outward position, and back again, is disposed within the underside of the floor of the expansion chamber.

It is a most unique object to provide a coach with an expansion chamber which can be configured to extend in one of two possible configurations, either rearwardly and forwardly; or sidewardly outward and then reversibly inwards.

It is a still further additional object to provide a dual drive mechanism for an expandable structure's expansion chamber.

Other objects of the invention will in part be obvious and will in part appear hereinafter.

It is a yet further additional object to provide a deployable rail system for an expandable structure wherein each rail has a primary section and a 180° pivotable secondary section.

The invention accordingly comprises the apparatus possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 1 is a perspective view of the expandable motor coach of this invention with a rear moving expansion chamber in extended position.

FIG. 2 is a right elevation of a closed coach according to this invention.

FIG. 4, 5 and 6 are stop action views of the coach shown in FIG. 3, at different points in time during the deployment of a rear expansion chamber in accordance with this invention.

FIG. 7 is a diagrammatic sectional view illustrating the walled construction employed with a rear moving chamber according to this invention.

FIG. 8 is a perspective view showing the swing rails moving into extended disposition.

SUMMARY OF THE INVENTION

Figure 3:
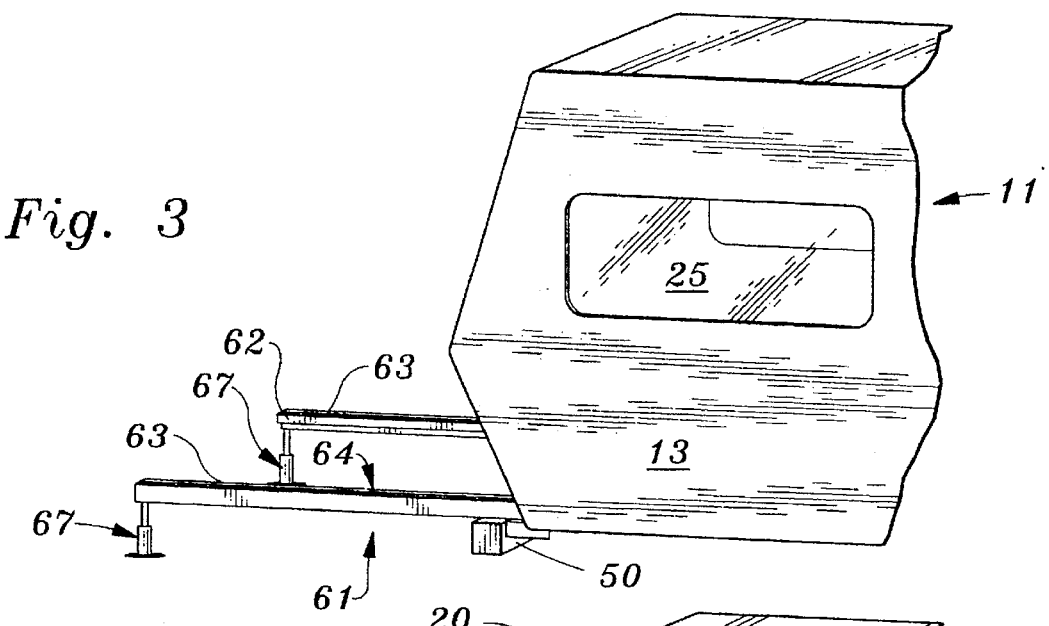
FIG. 3 is a right rear elevation of a coach according to this invention, prior to extension of the expansion chamber.

A structure, motorized or not, wheeled or not, having an interior living space, and which structure has at least one chamber. The expansion chamber(s) can be configured to move rearwardly and forwardly, or configured to move sidewardly outward and reversibly inward. Each of the expansion chambers comprises an open sided box having a top wall, two spaced sidewalls and a bottom wall and one of a rear or front wall in one embodiment; and which chamber in its second embodiment comprises an open sided box having a top wall, one sidewall and a bottom wall and both of a spaced rear and front walls.

The structure features a living space which has three fixed upstanding walls and a top and base, and which has no closing wall at the front and/or rear position, or alternatively no closing wall at the side position at which the respective expansion chamber is disposed. The expansion chamber is constructed such that its spaced walls (be they two sidewalls as in the first embodiment or front and rear walls as in the second embodiment) such that when in the retracted position the spaced walls are disposed in the first embodiment between the fixed inner walls of the living space and in the second embodiment proximal to one of the main body's fixed front or rear walls of the living space and distally spaced from the other of the main body's fixed front or rear walls.

In order to move to its expanded, or outer position, in the first embodiment, the expansion chamber sidewalls move from their respective first stowed intermediate disposition between the sidewalls of the main body's living space rearwardly or forwardly—depending upon the disposition of the expansion chamber relative to the living space—to a second expanded outer in-use position. Correspondingly the top and bottom walls move from a stowed disposition interiorly of the main body for the top wall and above the floor of the living space for the bottom wall respectively, to a second expanded outer in-use position linearly to the rear or forwardly of the living space.

In order to move to its expanded, or outer position, in the second embodiment, the expansion chamber front and rear walls move from their respective first stowed intermediate disposition between the front and rear walls of the main body's living space leftwardly or rightwardly—depending upon the disposition of the expansion chamber relative to the living space—to a second expanded outer in-use position. Correspondingly the top and bottom walls move from a stowed disposition interiorly of the main body for the top wall and above the floor of the living space for the bottom wall respectively, to a second expanded outer in-use position linearly to one side of the living space of the main body.

For support of said chamber, when it is in the outer position, a pair of deployable rails are moved from a stowed position to a deployed in-use position, cantilevered from beneath the body of the living space to support the expansion chamber. The deployable rail system of this invention represents an improvement over the prior art in that each rail comprises a primary section, with a 180° pivotable secondary section attached thereto.

DESCRIPTION OF THE PREFERRED EMBODIMENT

Let us turn first to FIG. 1. Here the expandable coach 10 of the first embodiment is seen in a rear perspective view in its expanded state, i.e., with the expansion chamber 12 extended rearwardly from the main body 11. The reader's attention is also directed to FIG. 2 which is a front perspective view of the first embodiment of the coach, but with the expansion chamber 12 in the retracted position.

Prior to discussing the details of the expansion chamber, and its operation, a brief time will be spent in the discussion on the actual coach itself and the mode of construction utilized to accommodate the movable chamber.

The coach 10, which, while renumbered for the purposes of the second embodiment, is basically the same coach prior to modification to accommodate the expansion chamber(s) for both embodiments. Hereinafter all directions and locations will be based upon a viewing of the coach from in front by the hitch. Thus coach 10 is seen to have a main body 11 comprised of a left outer sidewall 13, a top wall 15 and a right outer sidewall 19. See also FIG. 17. If the coach is a self-propelled, i.e., it has a motor, or if it is a towable coach with only one expansion chamber at the rear, the front wall 17, will be attached to the main body 11 as in FIG. 2. If the front section is also to be expandable, then the front wall forms part of the forward expansion chamber instead.

For ease and convenience the discussion herein of the first embodiment will be limited to a coach having but one expansion chamber; namely, in the rearward area of the coach. However, if a coach had a forward expansion chamber as well or in place of a rearward expansion chamber, the discussion concerning the structure would be equally applicable.

Thus in FIG. 2, it is seen that front wall 17 having a front window 27 is attached to the two aforementioned outer sidewalls 13 and 19 and to the top wall 15. (These sidewalls are referred to as outer sidewalls to distinguish them from the sidewalls of the expansion chamber.)

Outer sidewall 13 includes a forward window 23 and a rearward window 25. Similar or different window placement may be found in the unseen outer right sidewall 19. At least one door such as door 21 in the left sidewall as viewed from the front of the coach is found disposed conventionally in sidewall 13. All of the doors and windows are conventional and no criticality is to be attached to their shape or location. Coach 10 has no rear wall as the rear wall forms part of the expansion chamber as is seen in FIG. 1.

The main body 11 also is seen to include at least one set of retractable conventional steps 31, as well as two axles carrying wheels and tires 29, also of a conventional nature.

A third axle and double tires may be also be employed within the scope of this invention. Each pair of tires of said wheeled axles may be covered over by a fender 32 as is customary in the art.

Expansion chamber 12 includes a left sidewall 14, in which is a window 26, a rear wall 22 having a window 24, and a right sidewall 20, which right sidewall may also have a window. All windows in the expansion chamber are conventional windows of any of the varieties of double hung, slider, or fixed pane. For cosmetic purposes, all sidewall windows in the expansion chamber correspond in size and relative placement to be aligned with the rearwardly disposed sidewall windows of the main body 11, when the expansion chamber is in the retracted or stowed position. The reader is asked to contrast FIG. 1 and FIG. 2. Note in FIG. 2 that the opening 190 is the insertion point for hand crank 191 shown lying on the ground, to manually move the expansion chamber rearwardly as seen in FIG. 1.

Also seen in FIG. 1, are the special jacks 67 used to support the cantilevered deployed rails, 63, both of which elements will be discussed in detail below.

In the discussion of FIGS. 2 through 10 inclusive, of my parent application, discussion was set forth which illustrated the general concepts of the superstructure upon which the coach is built and the general principles of a movable expansion chamber for a coach. That portion of the parent case text and the related figures are incorporated herein by reference.

Figure 37:
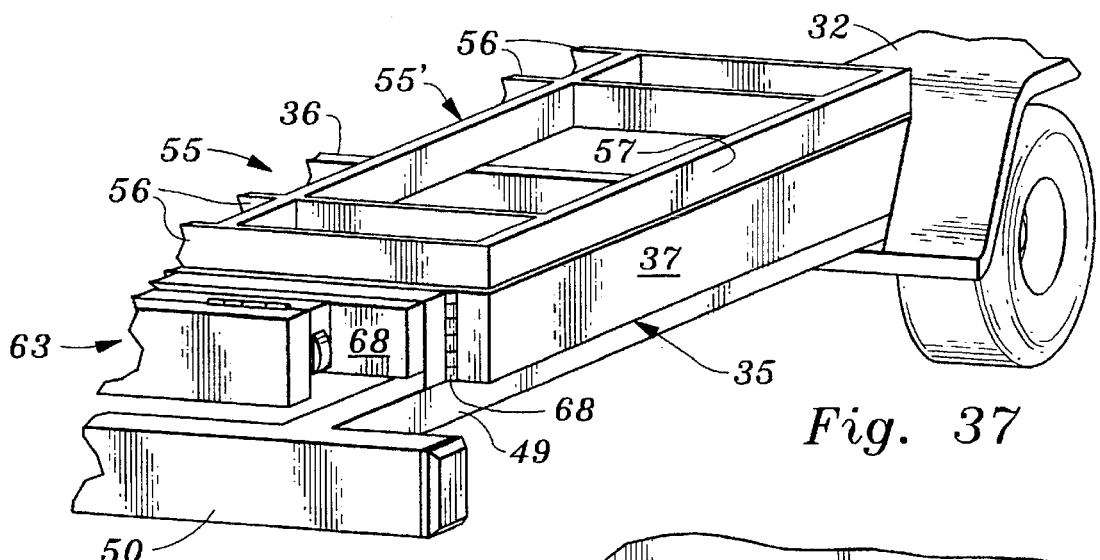
FIG. 37 is a perspective view illustrating the movable superstructure of the apparatus of this application.

The reader's attention is directed to FIG. 37, which depicts the chassis of the expansion chamber of the invention disclosed and claimed. The expansion chassis 55 includes a spaced series of crossmembers 56 connected at right angles to a trio of longitudinal members 57. Other aspects such as the underside of the expansion chassis will be discussed in connection with FIG. 21. The upper surface of the main body chassis which in FIG. 37 is covered over by the expansion chassis will be discussed below with reference to FIG. 20.

The bumper mount rail 49, to which the rear bumper 50 is attached also form parts of the superstructure of the main body 11 and are elements from my prior invention that are employed in this invention as well. Fender 32, one of two such fenders, is also seen in FIG. 37. Now that the reader has a general concept of the movement of the expansion chassis with respect to the main body chassis, but for an understanding of the rolling means which will be discussed infra, more can be told about the big picture, i.e., the movement of the entire expansion chamber relative to the entire main body.

Thus the reader's attention is now directed to FIGS. 2, 3, 4, 5, and 6. In FIG. 2, a full size coach of the first embodiment having only a rear expansion chamber is depicted. FIG. 2 shows the coach 11 in a non-expanded condition. Many of the individual elements of this embodiment's main body depicted here have been previously called out, but for the conventional tongue and front wheel assembly 33.

FIG. 3 is a close-up perspective view of the rear of the coach seen in FIG. 2, wherein the deployable rails have in fact been deployed.

Figure 4:
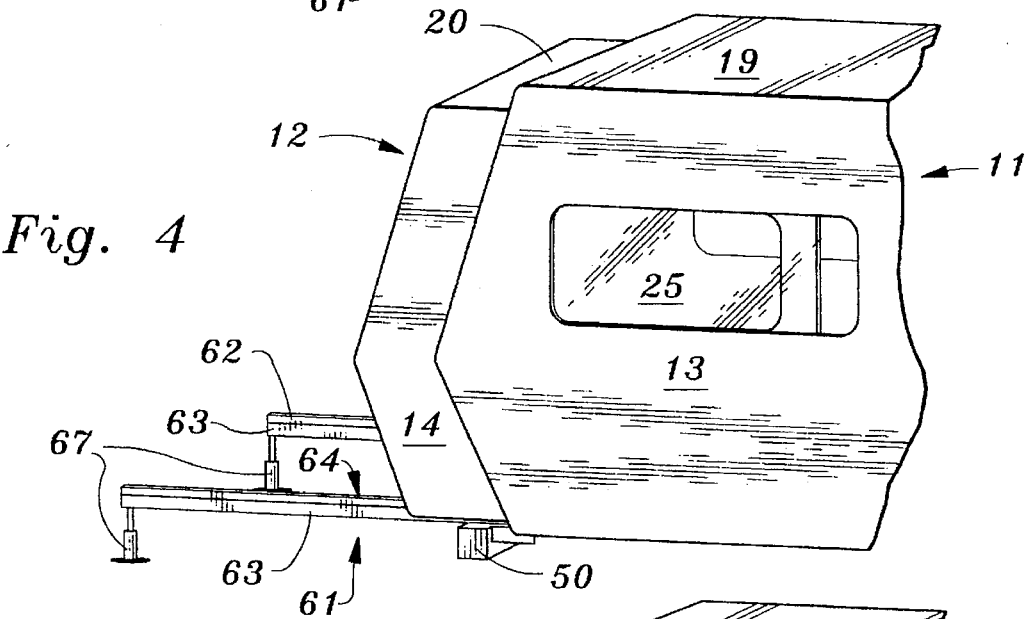

FIG. 4 is a first point in time wherein the expansion chamber is seen to be moving rearwardly out from its retracted position. Note the visible width of that area of sidewall 14 of the expansion chamber 12.

Figure 5:
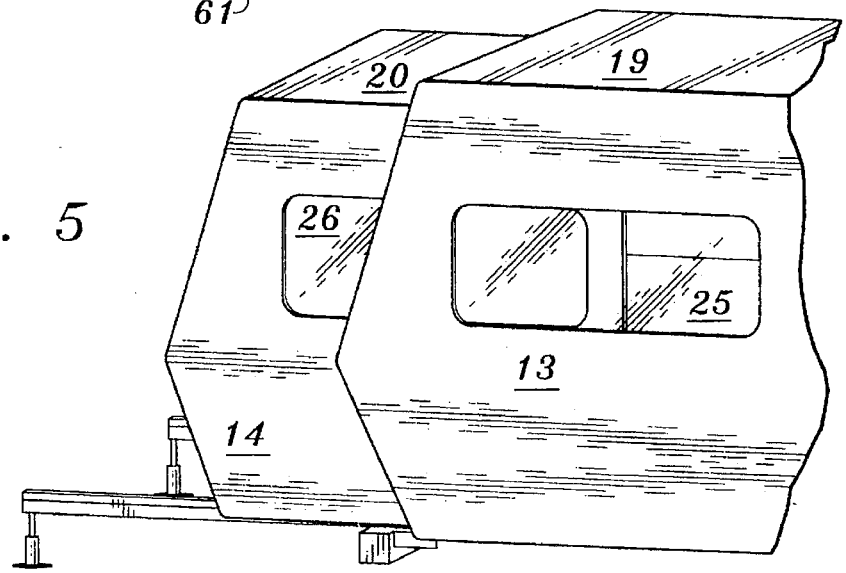

In FIG. 5, at a next finite point in time, more of said sidewall 14 is visible. Also seen is window 26 which is sized identically to window 25 and is placed for alignment both vertically and horizontally, when the chamber 12 is in the stowed position. Note how as the expansion chamber moves rearwardly, more and more of it is supported on the aforementioned deployable rails.

Finally in FIG. 6, the entire expansion chassis has moved outwardly. Later in the discussion to follow, the mechanism to relocate the expansion chamber from a stowed to an in-use position will be set forth.

As discussed above with reference to FIG. 37 which illustrates in perspective the concept of the superstructure of the apparatus of my previous invention which had two chaises, an expansion chamber chassis and a main body chassis, so too this invention employs the same principle. Here too, the superstructure consists of two chassis, an expansion chassis 55, and a main body chassis 35, the latter of which has a series of spaced crossmembers 36 connected in a conventional manner, as by welding, in a disposition normal to the spaced longitudinal side members 37.

The expansion chassis 55' front, rear and intermediate cross members 56, as seen best in FIG. 37, are connected to the spaced longitudinal members 57 in a conventional manner.

If desired, the crossmembers 36 of the main body chassis may include one box tube among their number. When such provision is made, one can store the small items within the confines of the box tube such as a jack rail, or other tools. A conventional cap, with a lock such as found on a gas cap, or merely a lock pin, not shown, keeps these items in place during travel.

In order to understand, the mode of construction that permits the rearward movement of a rear expansion chamber and the forward movement of a front expansion chamber, reference should now be made to sectional end view, FIG. 7. It shows, in a diagrammatic representation, the various walls employed in the main body 11 and the expansion chamber 12 and their relative disposition to each other. Here main body 11 is of a box-shaped configuration, which has the two outer sidewalls 13, 19; a top wall 15 and a bottom wall 46 which are shown as the outermost and topmost walls respectively. As one moves inwardly, it is seen that the interior structure is the smaller generally rectangular in cross section expansion chamber 12, with its two sidewalls 14, and 20 and its top wall 16 and bottom wall, 28. The sidewalls 14, 20 are disposed adjacent and parallel to and spaced slightly from the outer main body's exterior sidewalls.

Figure 20:
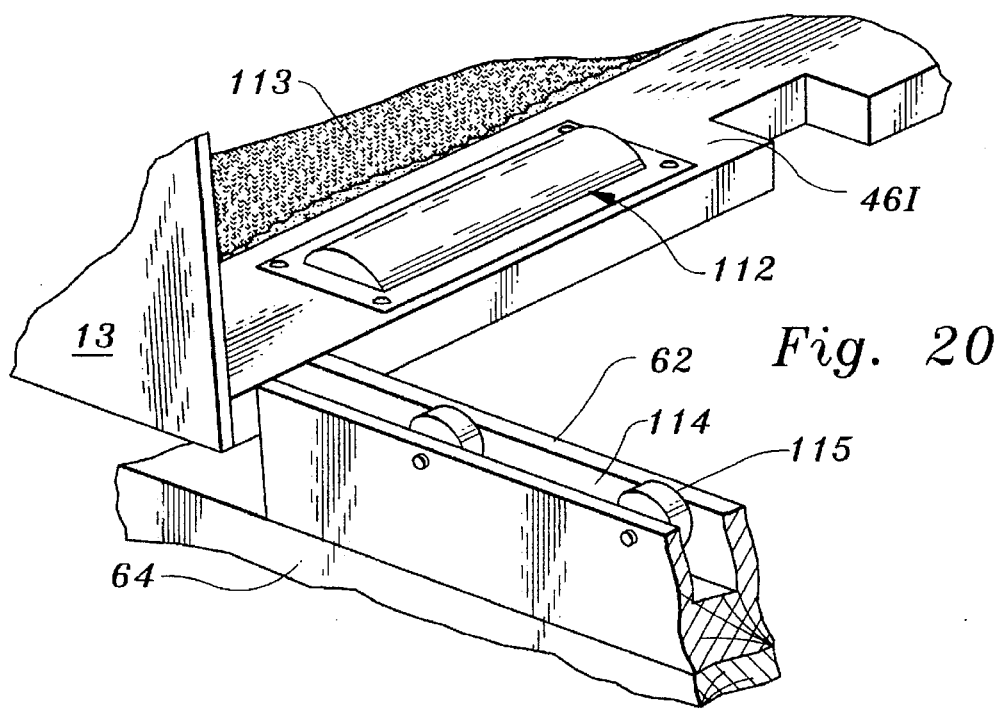
FIG. 20 is a close-up perspective view of the open rear in a coach with the expansion chamber removed and showing the left deployable rail partially deployed.

In this view two sets of rollers are also seen. The first pair are rollers 112 which are also seen in FIG. 20 and which constitute rollers mounted on the interior surface 46-I at the rearward end of the main body's bottom wall. This bottom wall 46, is mounted to the chassis of the main body which has been previously described. A carpet 113 is shown disposed in place on the surface 46-I.

The set of rollers 110, seen in the head on view of FIG. 7 adjacent to rollers 112 are mounted on the underside of the bottom wall 28, of the expansion chamber, 11. See also FIG. 21 which depicts the expansion chamber in an inverted position for ease of viewing.

Figure 9:
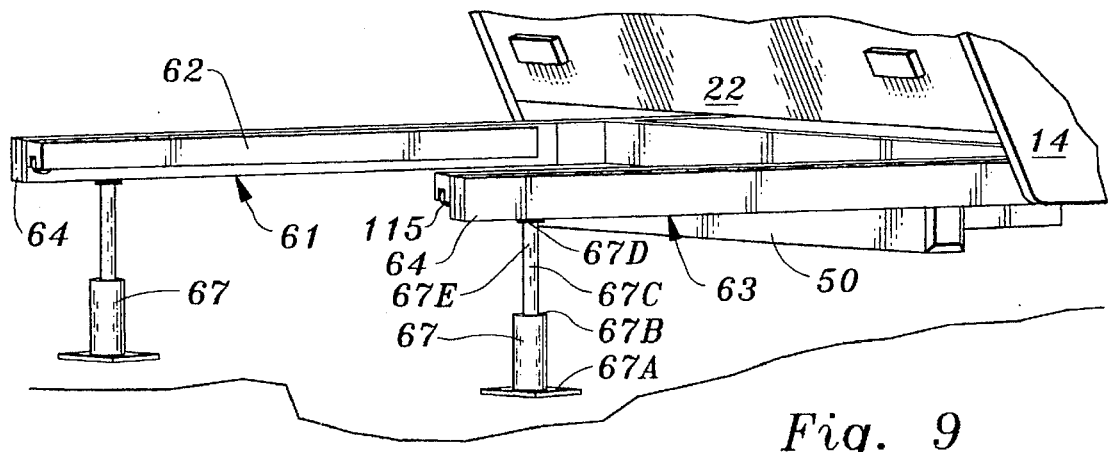
FIG. 9 is a perspective view showing the deployable rails in extended position for a first embodiment of this invention; namely, a rear moving embodiment.

FIGS. 8 & 9, depict the deployable rail system 61 and the deployment of the two deployable rails 63 for a rearward or forward moving expansion chamber. One such rail 63 is shown already in its deployed position, while the second one is shown at a point in time during its rotation from the first stowed transverse position to the second extended elongated position. Each deployable rail 63 is pivotally mounted at its proximal end-to a side member, 37, or perhaps to the rear cross member depending on the nature of the hardware employed, by conventional hinges, such as door hinges 68 visible in FIG. 37.

Figure 15:
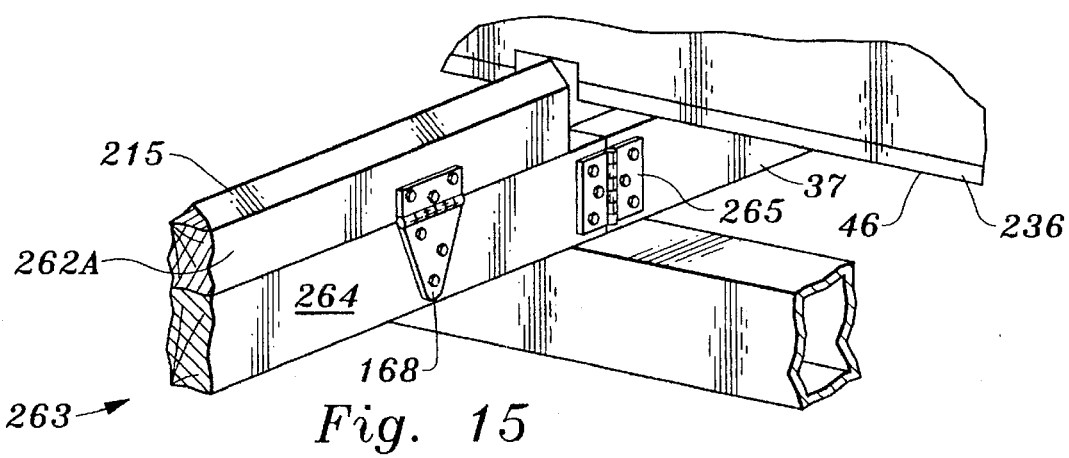
FIG. 15 is a close-up perspective view showing the interior side of one embodiment of a left deployable rail in deployed position at its point of mounting.

Each rail 63 includes a solid or hollow support bar 64, to which a pivot bar 62 extending outwardly along substantially the entire length thereof and is hinged thereto to pivot 180° from an at rest position to an in use position. This pivot bar 62, analogous to but different from the bar 262 shown in FIG. 15, is cut off at the end proximal the body to permit the aforementioned pivoting. Thus pivot rail 62 terminates rearwardly in a vertical plane just prior to the rear most cross member 36 of the main body chassis.

Figure 38:
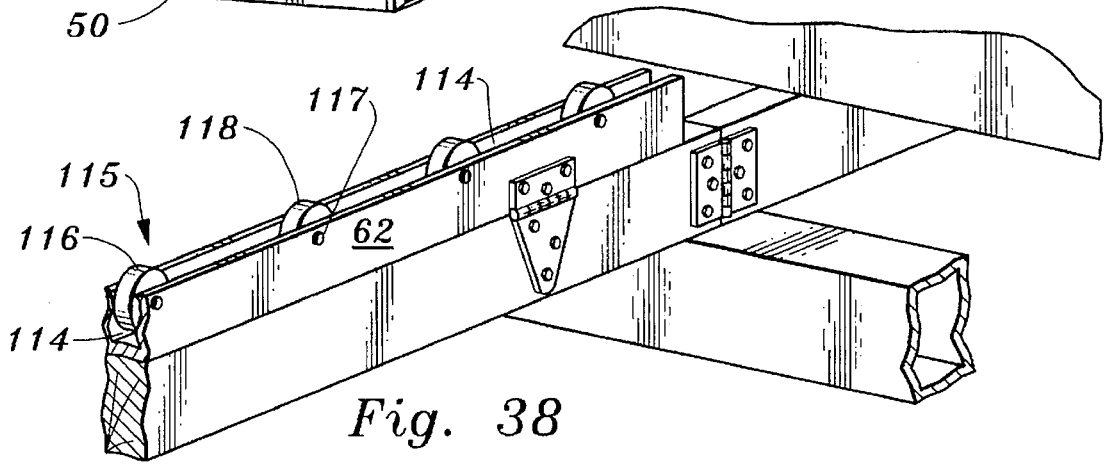
FIG. 38 is a perspective view showing a pivot bar hingedly mounted upon its respective support bar, and disposed in its in use position.

Each of the two pivot bars 62 has an elongated channel 114 which extends inwardly from its top in use surface along its entire length. Bar 62 includes a plurality of rigid casters, 115, each of which comprises a wheel 116 and an axle pin 117. Each wheel 116 extends into the channel 114 and above the channel as well. All of these elements are best seen in FIG. 38. In-line means fixed position, but the wheels rotate.

While a pivoting disposition is herein described for the deployment of each of the two rails, 63 it is to be appreciated that a linearly extendible and retractable disposition with a swing hinges for the pivot bar to dispose the pivot bar as aforesaid, is also contemplated by this invention. This second mode, while contemplated would be significantly higher in cost.

While FIG. 7 shows one rail fully deployed and the other rail in process of deployment relative to the rear wall 22 of the expansion chamber 12. The fully deployed rail 63 is being supported for safety sake upon special jack 67, more about which was recited with respect to FIG. 10 of my parent application, previously mentioned, but which was not claimed.

In FIG. 9, both rails are shown deployed but with their respective pivot bars in the downward at rest position. Also seen in FIG. 9 are the plurality of elements of the special jack 67. Jack 67 includes a conventional base 67A, a throat portion having a conventional ratcheting section therein 67B, an elevateable portion 67C which moves from a telescoped position within rise 67E and a plate 67D to which the riser 67E is attached. The special jack 67 serves to support the end of the deployed rail 63. The purpose of the jack is to ensure that the cantilevered rails 63 do not deflect downward due to the weight thereon when the expansion chamber is in its outward disposition for use. FIG. 9 also illustrates the point in time when the expansion chamber, whose rear wall 22 and one sidewall 14 are shown, is ready to move rearwardly into position for use.

Figure 10:
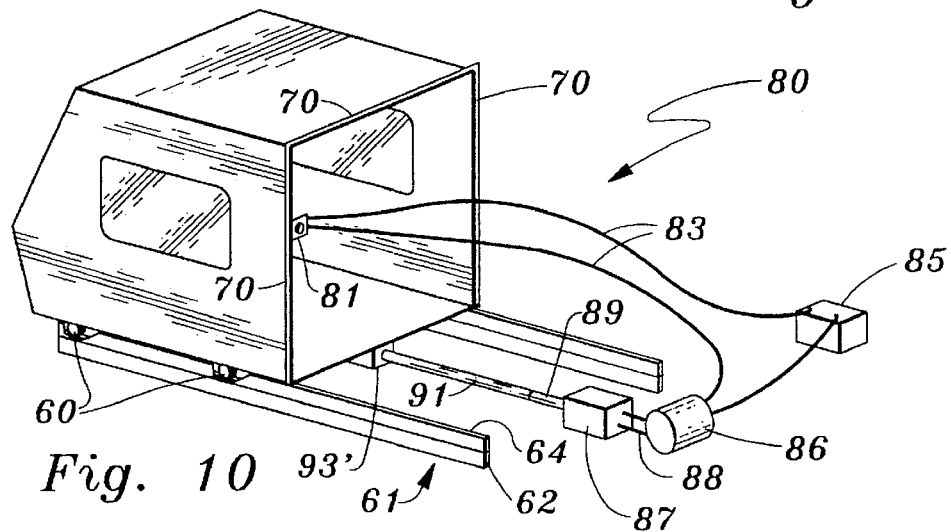
FIG. 10 is a diagrammatic view which shows the motor and associated mechanical parts to move the expansion chamber from a stowed to an expanded position and back to a stowed position.

Reference is now made to FIG. 10, which is a combination diagrammatic view and wiring diagram, the combination being designated 80. Reversing switch 81 preferably conveniently mounted on one side of the coach main body such as 13 as is shown, is electrically connected by wiring 83 to both battery 85 and motor 86. Motor 86 is secured in a conventional fashion to the frame as is known in the art. Motor 85 is electrically connected by wiring 88 to ram housing 87. From the ram housing 87 extends a fixed main ram 89 having an extension and movable portion 91 connected thereto. The extension portion has its distal end secured to an attachment mount 93 on the forward underside of the expansion chamber 12. Such rams are well known in the art as are the means for activating them. Switch 81 is designated a reversing switch, because associated therewith is any other electronics needed but not shown, to reverse the operational direction of the motor that controls the operation of the ram to cause the expansion chamber to retract into the closed position after its outward disposition. Over expansion and over retraction are prevented by setting certain adjustments on the ram. It is well within the skill of the art to set the ram for correct operation. Therefore no barrier stops are needed to prevent over travel in either direction by the expansion chamber.

The reader recognizes that artistic license has been taken with respect to the actual position of wiring 83. In point of fact wiring 83 is buried either in conduit or between the out sidewall and the inside wall, just as in a wood home and then extends down along the chassis to the battery and motor 85 and 86 respectively. In addition, only the expansion chamber is depicted, the main body has been omitted in this figure.

It is also to be understood that while the switch system 80 is shown here with respect to a rearwardly traveling expansion chamber, substantially the same means would be used for the sidewardly extending embodiment to be discussed below.

Figure 11:
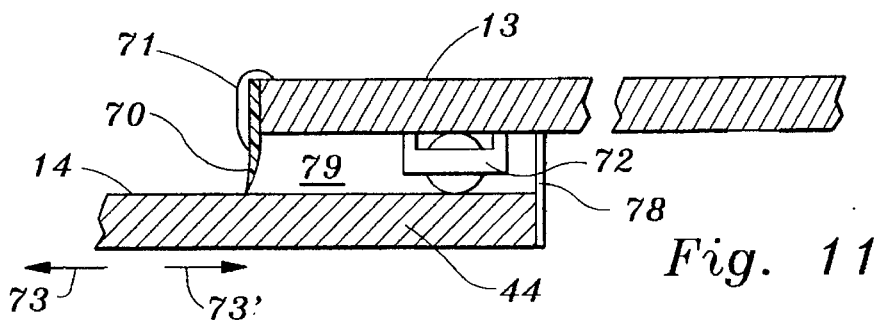
FIG. 11 is a diagrammatic top close-up view showing the relative positioning of the left sidewall of a rear moving expansion chamber as it moves from stowed to an expanded in-use position from between the interior and exterior walls of the main body of the coach.

In FIG. 11, which is a diagrammatic top plan, the relative positioning of the main body's left side exterior wall 13 and interior wall, 44 and the expansion chamber's left sidewall 14 are shown. The flap 70, attached to the exterior wall of the main body, and which flap is made of a resilient polyurethane elastomer, much like a windshield wiper, acts as a seal to keep out air and moisture. The flap 70 is retained in place by a moulding trim strip 71 which serves also to smooth the corner of the main body and adds a cosmetically complete factor.

It is to be understood that FIG. 11 is merely illustrative of the operating principle concerning the flap 70. Indeed, the flap 70 extends over the top, down the left and right side of the coach, and optionally along the bottom wall. See FIG. 10, but note the absence of the optional trim strip due to the size of the illustration.

Also seen in FIG. 11 is an optional but recommended roller 72 installed near the upper edge of the inner side of the exterior wall of the main body, and perhaps on the underside of the top wall of the main body. The purpose of rollers 72 is to apply pressure to the expansion chamber sidewall 14, and if present to the respective top wall as well, to prevents the expansion chamber from undergoing torque. That is, the rollers 72, such as model number 1.9 DIA Roller S/T sold by Industrial Belting and Supply, Inc. and which are similar to the rollers 112 seen in FIG. 20, ensure a smooth nonjerky transition of the expansion chamber from the storage inward position to the at use outward disposition position. Thus the direction arrows 73, 73' indicate the bi-directional movement of the expansion chamber relative to the main body.

It is also recommended that a flexible dust flap 78 be installed on the interior end surface of each wall of the expansion chamber as seen in FIG. 11, to keep dust and dirt and other things from entering the space 79 between the walls of the expansion chamber and their respective adjacent main body wall.

Figure 12:
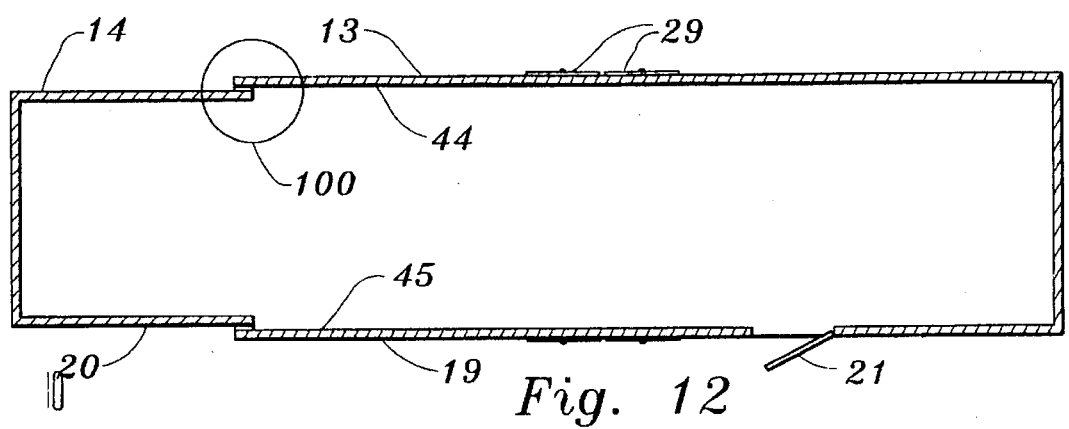
FIG. 12 is a top plan diagrammatic view of a coach with a single rear expansion chamber in the outward position.

The reader's attention is now directed to the next figure, FIG. 12, which is a zoomed out diagrammatic top view showing the total coach without the roof and a single rear moving expansion chamber in the outer in-use position. Artistic license has been taken in this drawing, which shows no windows on each side of the coach, yet illustrates the point of discussion. The circled area 100 is the area shown in the previous figure, FIG. 11.

Having seen the relative positioning from the top and exterior, should the reader desire to view the movement of the expansion chamber relative to the sidewalls of the main body. Reference can be made to the text pertaining to FIGS. 22 and 23 of my parent application, which text is incorporated herein by reference.

Figure 22:
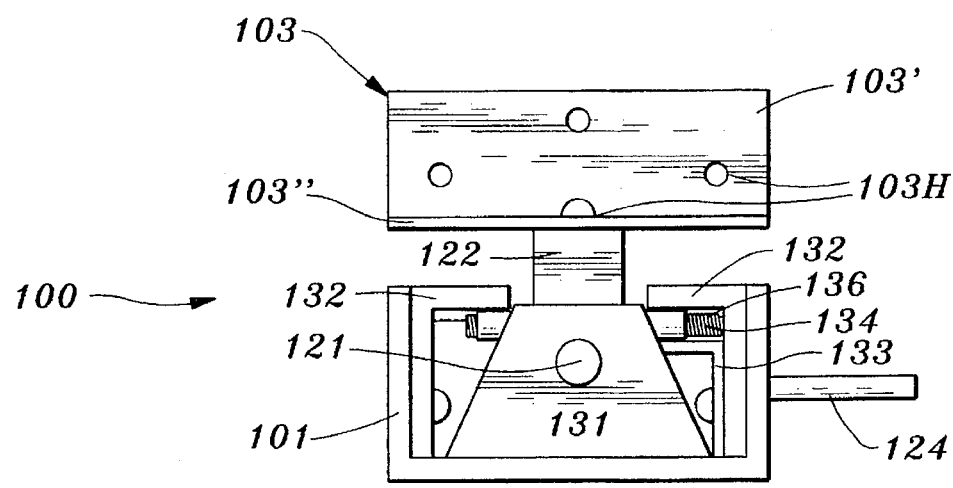
FIG. 22 is an inverted rear elevational view of the primary drive mechanism of this invention.
Figure 23:
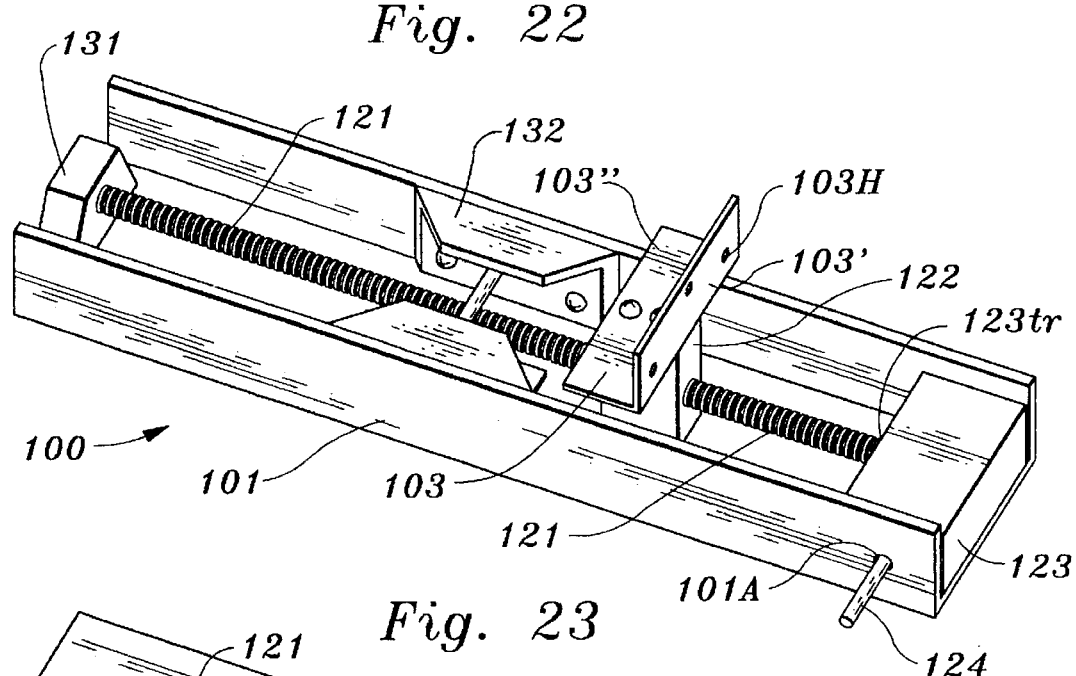
FIG. 23 is an inverted front top perspective view of the primary drive mechanism of this invention.

Also discussed in my parent application and also shown in FIGS. 22 and 23 of that patent application are a series of roof trusses. Such trusses may be utilized with the two embodiments of this invention as well since their presence does not impair the inward and outward travel of the expansion chamber.

While only a minimum amount of discussion has taken place with respect to the utilization of two expansion chambers, one at the forward end and one at the rearward end of within the coaches within the confines of this first embodiment, in those coaches where two expansion units are employed the operation of a forward such unit would be the same as the operation of a rearward moving unit as has been described herein in detail.

In my parent application, I described the use of a retention bar to maintain the deployable rails in their spaced parallel relationship for the in use position. A variant means to accomplish the same result, was also discussed. Either of these or for that matter any other means can be used to achieve the same result; namely, to retain the two deployed arms in a parallel relationship.

The discussion now moves to the second embodiment which pertains to a sidewardly and outwardly moving expansion chamber, i.e., one that moves 90° to the central axis of the coach, and accordingly the reader's attention is directed to FIG. 13 through 19 inclusive.

For the most part, the components of this embodiment are similar both in construction and in operation to the components of the first embodiment. The differences in construction and operation will be discussed hereinafter. Those parts that are the same as elements previously discussed will retain like numbers. Those parts that differ will be given numbers within the 200s series.

Figure 13:
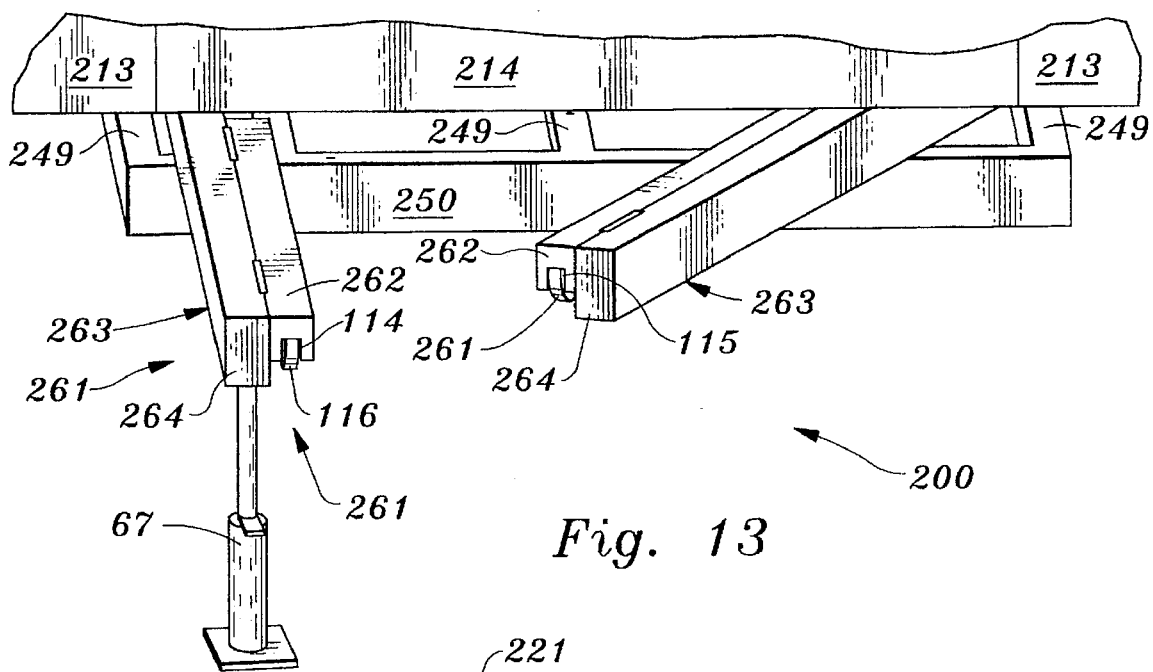
FIGS. 13 & 14 are views similar to FIGS. 8 & 9, but for a second embodiment of this invention; namely, a sideward extending embodiment.
Figure 14:
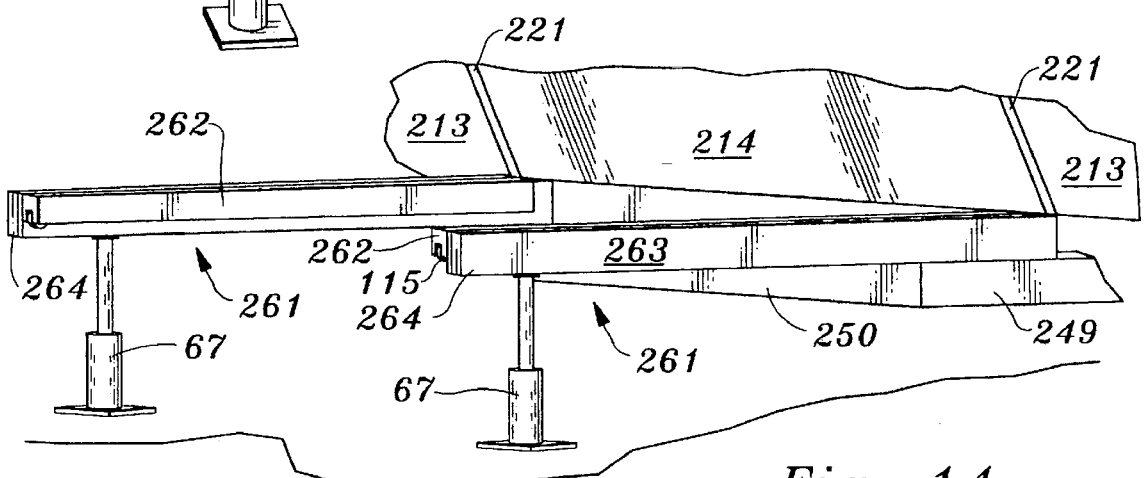
Figure 16:
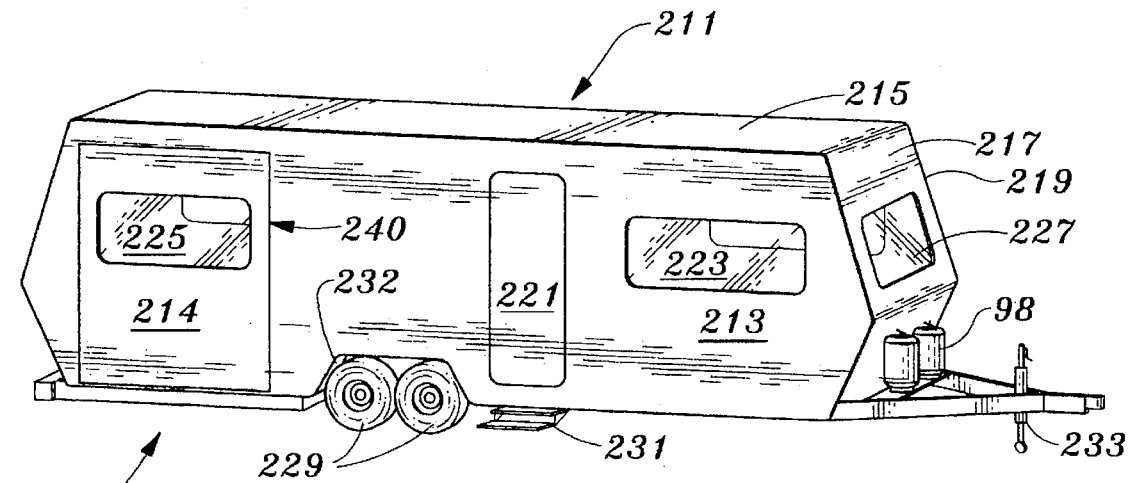
FIG. 16 is a right elevation of the second embodiment of a coach according to this invention with the expansion chamber in closed position.
Figure 17:
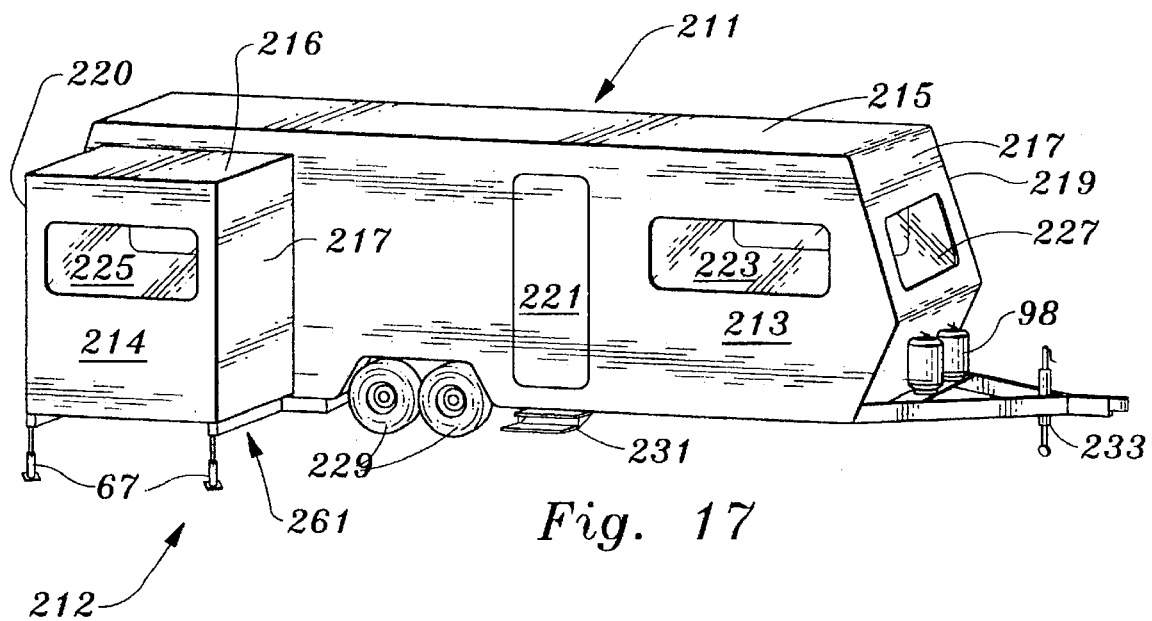
FIG. 17 is a view similar to FIG. 16 but with the expansion chamber in open position.
Figure 18:
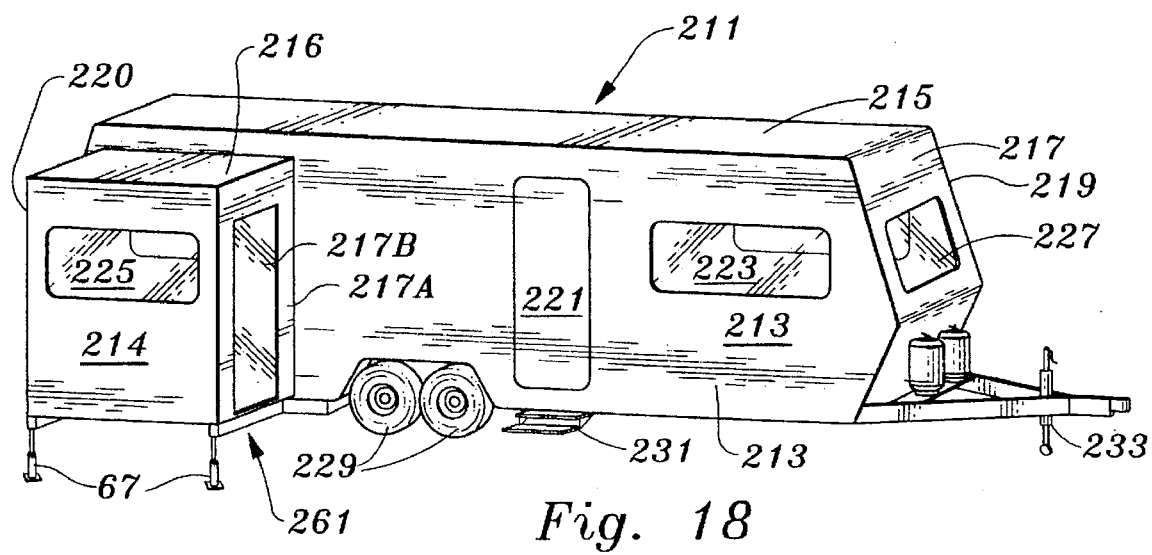
FIG. 18 is a view similar to FIG. 17 but depicts a variant; namely, the inclusion of an extra door in the expansion chamber.

In this embodiment, for which quick reference may be had to FIGS. 16 and 17 which show the respective outward and inward dispositions of the side moving expansion chamber, and to FIG. 18, which depicts a minor variant, the structural aspects may be found in the text pertaining to FIGS. 13, 14 et. seq. In order to remain clear about points of reference, for this second embodiment, the front wall and the rear wall respectively will be deemed the walls that are parallel to the front wall of the main body of the coach in a single rear moving expansion chamber model. The single sidewall of this embodiment's expansion chamber is the wall that lies parallel to the main body sidewall when outward and is in line therewith when in the chamber is in its inward disposition. And, again the perspective is taken from a viewing point where the viewer would stand in front of the coach. Thus in FIGS. 4, 5, 6, 10, and 16–18 the exterior wall facing the viewer is the LEFT wall from the vantage point noted above.

In FIG. 13, the second embodiment 200 of the invention features a side moving chamber 212 within a main body 211. The sidewall of the coach is designated 213. This wall includes an opening 240 slightly larger than the height and width of the expansion chamber 212. The front wall 17 and the top wall of the coach main body retain their old numbers. The now fixed rear wall of the coach is designate 222 per FIG. 18.

The expansion chamber has a front wall 217, a rear wall 220 and a left sidewall 214. The top wall is 216 per FIG. 17 and the open wall to the interior is designated 218, while the bottom wall or floor is not seen. The window in the left wall of the chamber is designated 225. Window 225 may be a fixed pane or venting in the format of a slider, jalousie, or double hung. Since the window of the sidewall of this chamber is not adjacent to any other wall, a pivoting outward style window may be employed if desired. All other two digit elements such as propane tanks 98 (FIG. 17) are the same as elements of the first embodiment bearing like numbers.

The reader's attention is now directed to FIG. 13. A portion of the coach's sidewall 213 is seen to be disposed on opposite sides of the left sidewall 214 of the expansion chamber. Disposed beneath the sidewall of the chamber on the underside of the floor are a series of approximately three connector bars 249, which are disposed normal to the length of the coach and which are attached in a conventional fashion at their respective ends not seen, to elongated member 37 seen in FIG. 37.

Each of the parallel connecting bars 239 is connected on the proximal end to antiflex bar 250. This support bar 250 serves the same function as the rear bumper; namely, to prevent the deployable rails from bending downwardly when the chamber is disposed in its outward in use position.

The deployable rail system 261 is substantially the same as deployable rail system 61, but is designated in the 200 series of numbers firstly due to its physical position on the side of the coach. In this embodiment, (and in the previous one as well, though not so indicated), the pivot bar may be of two different configurations. Thus system 261 includes a pair of deployable arms 263, each of which includes a support bar 264 and a pivot bar 262 or a pivot bar 262A hinged thereto, by hinges, which hinges may be similar to the HL hinges 168 of FIG. 15, but which hinges are not seen in FIG. 13. However, any conventional hinging system may suffice for this purpose.

Bar 262 as seen in FIGS. 13 and 14 include a plurality of rigid casters, 115, each of which comprises a wheel 116 and an axle pin 117 which is disposed through the walls of bar 262 on opposite sides of the channel 114. Each wheel 116 preferably extends into the channel 114 and above the channel as well. Reference is made to FIG. 38.

In the alternative, each of the two pivot bars 262A, as per FIG. 15 has an A shaped metal section 215, extending along the length thereof and integrally formed therein, and designated as a caster rail, and which extends along the entire length of the pivot bar. When the A-shaped section 215 is employed, part of the movement of the expansion chamber is on V-groove casters such as will be discussed in connection with FIG. 27.

The operation of rail system 261 is the same as the operation of the deployable rail system 61. Elements 21, 23, 27, 29, 31 and 33 are a left side door, a left side window disposed in the left sidewall, the front window, a pair of axled wheels, a conventional van step set, and a conventional elevateable jack respectively. The pivot bars 262 and 262A both pivot in like manner, but as indicated, the movement of the expansion chamber depends upon elements dependent upon which of the pivot bars is employed.

In FIG. 17, the side mounted expansion chamber has been moved to its outward in use position. Thus the top wall 216 and the front wall 217 are now visible. The ram system employed to carry out the movement is the same as the one employed with the first embodiment, but merely rotated 90° for proper orientation.

The variant as seen in FIG. 18, differs from the embodiment discussed with respect to FIGS. 16 and 17 in that the front wall 217 of the expansion chamber has been replaced by front 217A which has an openable door 217B therein.

This door is preferably of a sliding nature, but if hangable, should pivot inwardly to avoid problems during disposition of the chamber from one location to another, that could arise, if the door were to be left in a slightly ajar forwardly open position.

Figure 19:
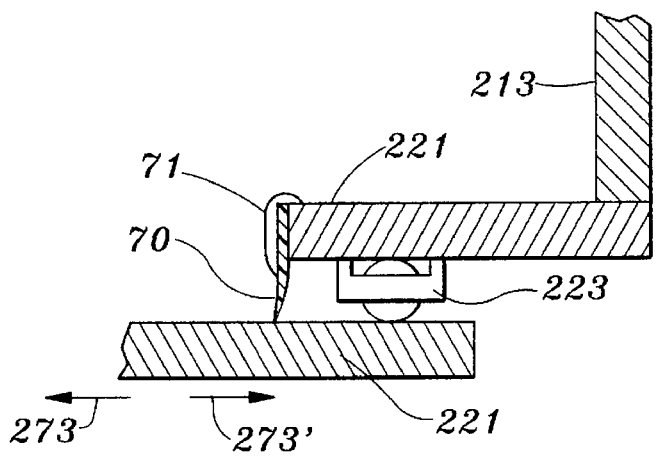
FIG. 19 is a view somewhat similar to FIG. 11, but which illustrates the movement of the side moving second embodiment.

FIG. 19 illustrates the movement of the side moving chamber relative to the left sidewall 213. In order to accommodate the anti-torque caster 223, a short wall segment, perhaps two to four inches in extension and which also serves as a cosmetic frame for the expansion chamber may be employed. The actual disposition of such a short wall segment is shown also in FIG. 14. This wall segment could be internally disposed as well and as such would not be seen from the outside. See FIG. 17 for example. Wall segment 221 is disposed normally outward to the sidewall 213 adjacent the front rear and top walls of the expansion chamber. While an anti-torque caster 223 is depicted, a roller similar to roller 72 may be substituted. Seal 70 and trim 71 play the same roles as discussed earlier. Arrows 273 and 273' designate the inward and outward movement of the rear wall 220 and the balance of the chamber 212.

FIG. 20 as depicted, due to the presence of the right sidewall 13 is seen to be pertinent to the first embodiment. This figure serves to illustrate the disposition of the roller(s) upon which the chamber rolls from its first position to its second in use position. Rollers 112 only one of which is seen, are mounted on the interior surface 46I of the floor of the main body adjacent the exterior edge thereof. Rug 113 is disposed upon floor 46I and terminates just short of the rollers 112. Pivot bar 62 is seen to be in its upward in use position as the casters in the channel are plainly visible.

The discussion concerning the rug 113 and the rollers 112 is equally applicable to the side moving chamber as the same technology is employed.

Figure 21:
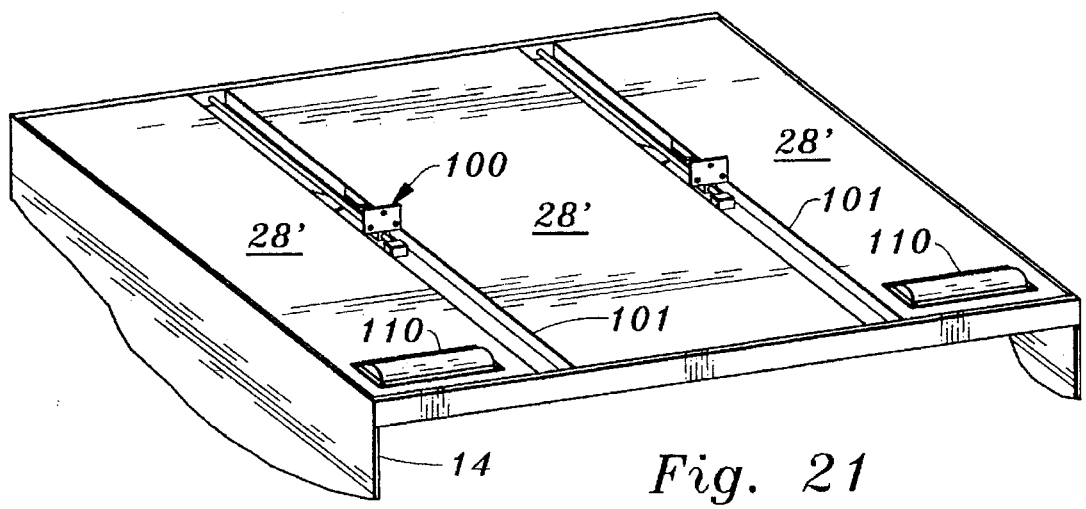
FIG. 21 is a perspective view of the underside of the floor of an expansion chamber of this invention.

The reader is next invited to view FIG. 21. This is a perspective view of the front underside of an expansion chamber. This chamber as configured can be utilized for sideward out and in, or rearward out and in movement. Upon inversion and upon viewing this figure from the perspective of the front of the coach it is seen that there is conformity to the nomenclature of FIGS. 4 and 7.

The underside of the chamber includes a floor 28 which is formed of several components. These include flooring segments 28', here a trio being shown, each of which is separated by an inverted U-channel 101. Each floor segment 28' may be made of several panels laminated together, such as of foam or plywood, (or, a full width single set of these laminated panels may be used.) These U-channel members, 101, are four in number, each about 8 feet long, 4 inches wide and 2 inches high, as per FIG. 25 to which reference is made temporarily. Two act as outer edges and two form a portion of the overall motion mechanism 100 the structure of which is seen in FIG. 22 et. seq., and the discussion about which follows infra. A pair of spaced similar U-channel members 102 serve as leading and trailing edges to provide rigidity to the floor. Note that each of the channels 102 includes a cut out 102S to effectively lengthen the interior channels for the operation of movement mechanism 100.

Figure 25:
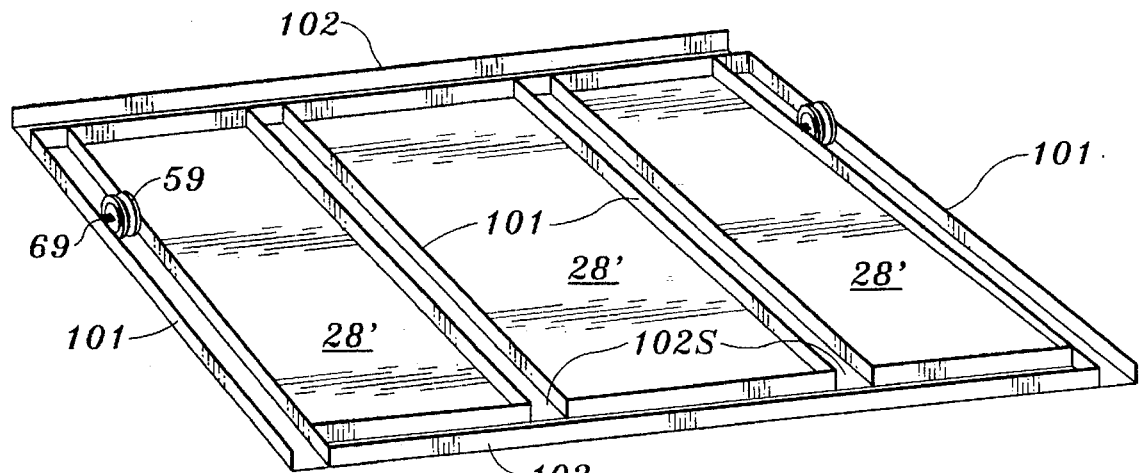
FIG. 25 is a perspective view of the lower surface of the expansion chamber chassis.

Also seen in FIG. 25 are a pair of V-groove casters 59 mounted as by a caster flange 69 into the outer two longitudinal members of the expansion chassis. These optional casters 59 are only disposed within the longitudinal members, when the pivot bar employs an A shaped metal section, extending along the length thereof and welded thereto and designated as a caster rail, and which extends along the entire length of the pivot bar as discussed elsewhere herein. These casters should be located approximately 20 to 24 inches away from the closed end of the expansion chamber in the longitudinal members.

Figure 27:
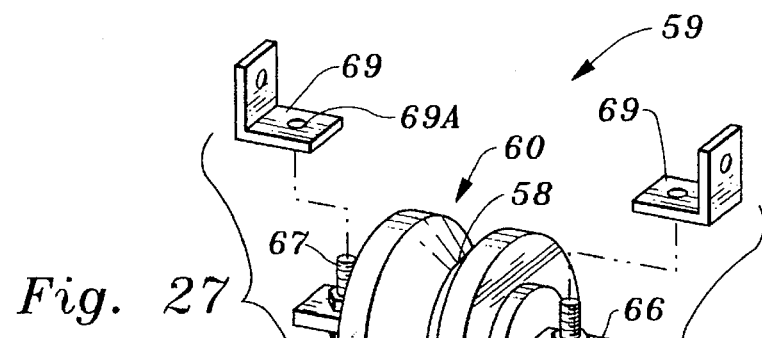
FIG. 27 is a perspective view of a V-groove caster employed in this invention.

Reference is also made to FIG. 27 where the caster 59, is seen along with the caster flange 69 which has two apertures 69A therein for mounting bolts not shown.

The discussion returns now to FIG. 22 where there are also seen to be a pair of downwardly directed flanges, 103'. These appear upstanding, but the chamber as seen here is inverted. More about these downwardly directed flanges 103 will follow infra. The two rollers 110 are similar to the rollers 72 previously addressed.

In FIG. 22 there is seen one of the two L-shaped brackets 103. It includes a trio of mounting holes on one flange, 103' and a pair of mounting holes on the other flange, 103", the latter of which are not seen in this view.

Flange 103' is secured to the lip or edge of the main body's base 46, which base is seen in other views. If the expansion chamber is a rear moving one, then the flange 103' attaches to the rearmost edge of the main body's floor. And if a front moving chamber, then to the front most edge of the main body's floor, and of course at the appropriate location on a side moving expansion chamber.

The second flange, designator 103" is seen to be secured through holes 103h into acme block 122. The acme block is a block having internal threads, not seen, for receipt of the first threaded acme rod 121. See also FIGS. 23 and 24. An acme rod and acme block are so designated because acme threads are employed thereon. Such threads are utilized on very carefully machined parts, but are common in industry. Thus the acme block travels along the first acme rod 121 and as such is capable of movement along the length of the channel in which the acme rod resides as will be discussed infra. See also FIG. 29.

Mounted suitably within the motion mechanism 100's U-channel at one end thereof is a gear motor 123. The motor can be at either the leading or the trailing edge within the channel as may be desired. The motor 123 has a threaded recess 123tr, noted in FIG. 23 which is adapted to receive one threaded end of the first acme rod 121.

Figure 26:
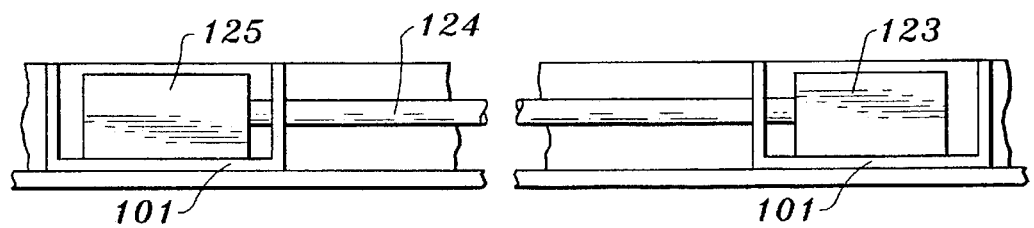
FIG. 26 is an elevational view of a portion of the dual drive mechanism of this invention.

As seen in FIG. 23, U-channel 101 has an aperture 101A aligned with drive shaft 124 which emanates outwardly and sidewardly from the gear motor 123. Shaft 124 extends from the first interior U-channel, through an aligned aperture 101A of the second interior U-channel as per FIG. 26 to a right angle gear box 125, whose contents are seen in FIG. 39.

Figure 39:
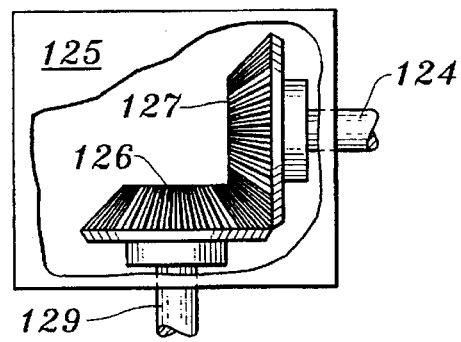
FIG. 39 is a top plan view of a gear box and its contents which form a portion of the dual drive mechanism of FIG. 26 of this invention.

The gears seen in FIG. 39 are seen to be a pair of miter bevel gears having intersecting axes. Shaft 124 terminates in a first bevel gear 127, which gear is interconnected to a second gear 126 to give the rotational motion of the rod 124, a 90 degree change in direction. Second gear 126 is attached to second acme rod 129. Thus one motor serves to drive two acme rods and the movement of two acme blocks.

While a dual drive system is being discussed, i.e., using two acme rods each with its own acme block in a pair of spaced U-channels, it is also within the scope of the invention to utilize but a single drive system with only one centrally disposed acme rod. The advantage of the dual drive system is that torque is reduced.

Figure 24:
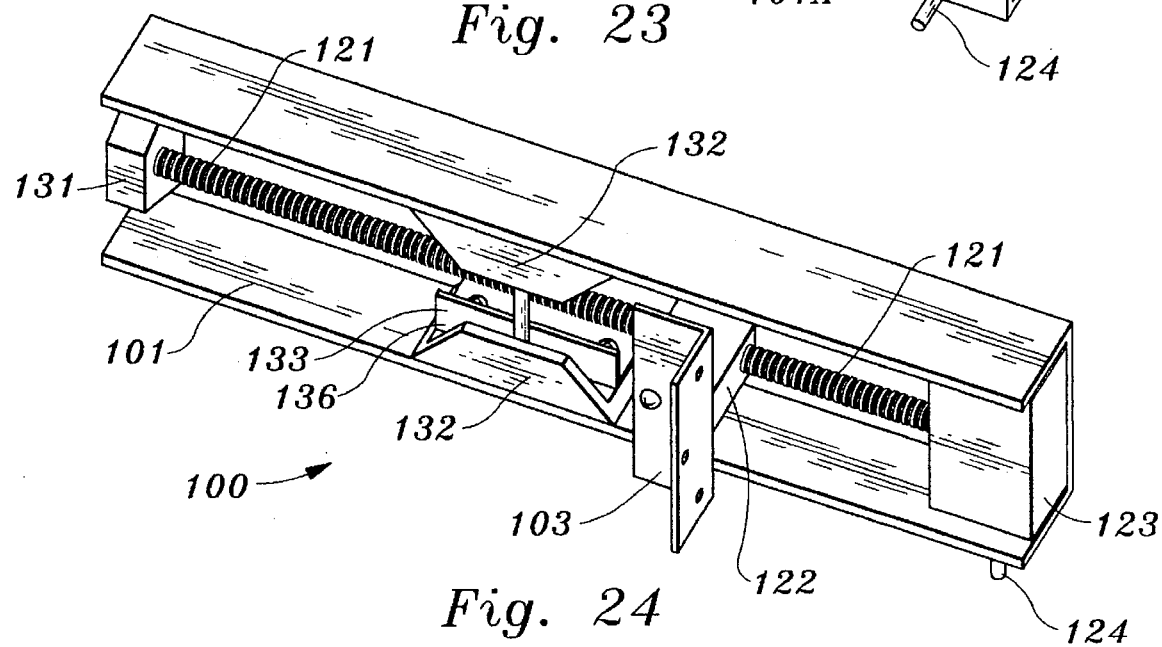
FIG. 24 is an inverted rear top perspective view of the primary drive mechanism of this invention.

As seen in FIGS. 23 and 24 a pillow block 131, which may have chamfered upper edges is mounted at the opposite end of the channel distant from the gear motor or gear box.

The pillow block 131 has an internal opening for the receipt of the second end of the acme rod. The pillow block serves to support and retain the acme rod in horizontal alignment at its second end.

Returning now to FIG. 22, there are seen a pair of opposed L-shaped members, 132. In this inverted view, they appear inverted, but in fact they are L-shaped. These members 132 are mounted within the confines of the interior U-channels at about the midpoint of the length thereof. Mounted on the interior of one of said L-shaped members is a smaller L-shaped member 133. Smaller L-shaped member 133 is of a lesser elevation but of substantially the same lateral disposition as the L-shaped member to which it is mounted. Thus a slot 136 is formed between the two spaced laterally disposed sections of the L-shaped member and the smaller L-shaped member.

Coil spring 134 is mounted on its first end on a post, not visible in FIG. 22. The coil spring's second end floats within the slot 136, abutting neither of the laterally disposed sections of the L-shaped members and the smaller L-shaped member.

In FIGS. 23 and 24 L-shaped members 132 are also seen. Optionally the edges may be chamfered as shown to ease the ability to gain access to the vertical portion thereof to secure the members in place within the U-channel via screws, one of which is visible in FIG. 24. In addition the chamfering is cosmetically enhancing and provides safety from hard corners during servicing. Further discussion concerning FIGS. 24 and 25 is unnecessary as no other undiscussed elements are shown.

The V-groove caster depicted in FIG. 27 is purchasable in the marketplace from such vendors as McMaster-Carr at any of their locations in the U.S.A. The V-groove caster 59, comprises a caster wheel 60. Disposed between each of the two halves of the wheel 60 is a V-groove, 58. The V-groove is adapted to engage the A-shaped section 215, disposed on the top surface of the pivot bar 262A. Caster 59 also includes an apertured flanged axle, 66, each of the two flanges present having a mounting bolt 67 disposed therein and shown in a respective aperture of said flange.

Figure 28:
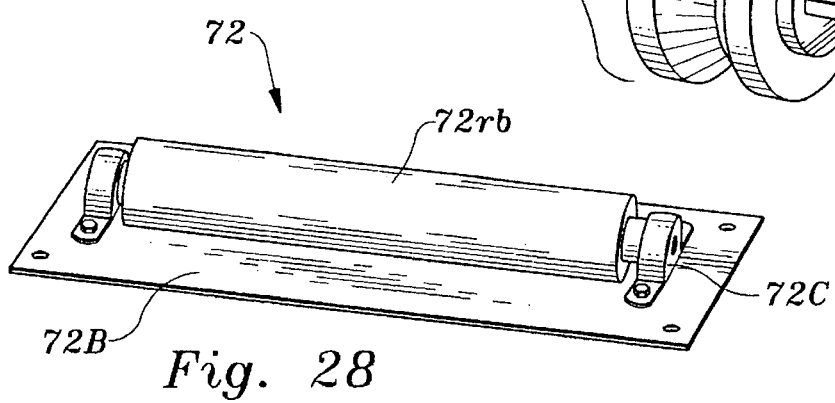
FIG. 28 is a perspective view of a roller member utilized in this invention.

In FIG. 28, there is shown a close-up view of roller 72 which is related to roller 112 previously described in connection with the discussion of FIG. 20, and which has also been somewhat discussed. The distinction is that roller 72 has approximately 75% of the roller body 75rb above the surface of the base 75B, as contrasted to only about 25% of the roller body being above the surface as shown in FIG. 20.

Figure 29:
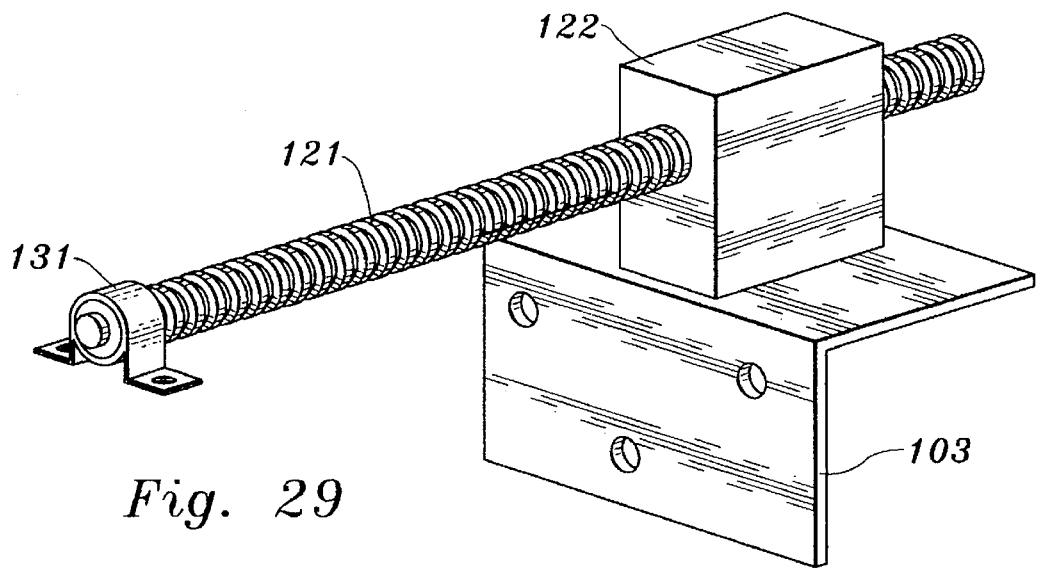
FIG. 29 is a close-up perspective view showing the mounting at one end of the threaded drive rod employed herein.

FIG. 29 is a close-up perspective view showing the pillow block and the acme rod 121 with the acme block 122 disposed thereon, all of which have been removed from the U-channel for ease of viewing.

Figure 30:
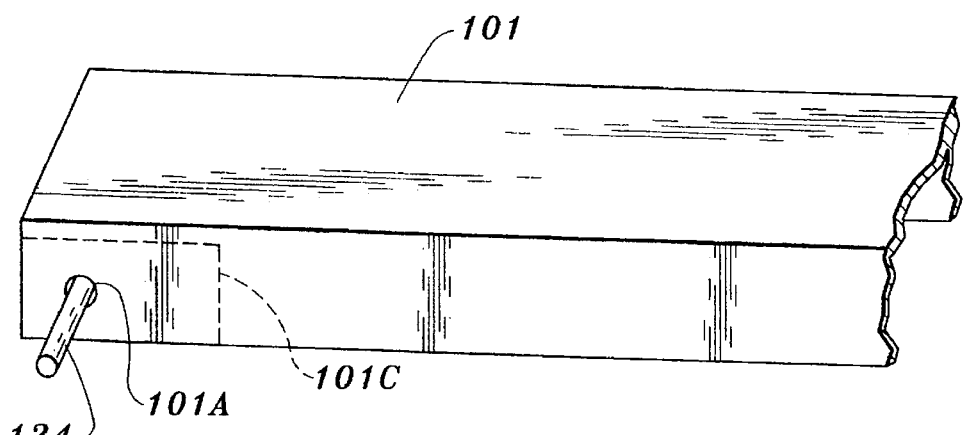
FIG. 30 is a top perspective view of the U-channel housing the motion mechanism of this invention and one element thereof.

FIG. 30 depicts a top plan view of one of the two U-channels 101. This channel is seen to be a conventional aluminum or other metal member. An optional cutout 101C is shown in dotted line. This cutout if present permits easier access to the gear motor 123 not visible in this view. If cutout 101C is not present, then aperture 101A would be present to permit the extension of the drive shaft 124 from the gear motor 123 to gear box 125. The reader is again referred to the discussion concerning FIG. 39 supra.

Figure 31:
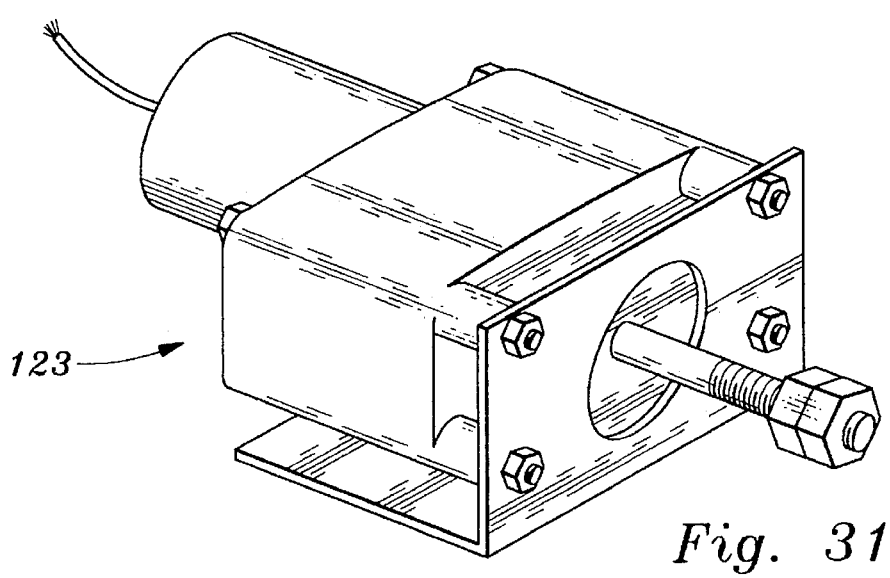
FIG. 31 is a perspective view of the motor utilized with the drive mechanism of this invention.

FIG. 31 is a close-up perspective view of a suitable gear motor, 123, suitable for use in this invention. Such motors are within the 0.25 to 1.0 horsepower range and are made by such manufacturers as Barker Manufacturing Co. The motor features a geared power head at a 34:1 ratio.

Figure 32:
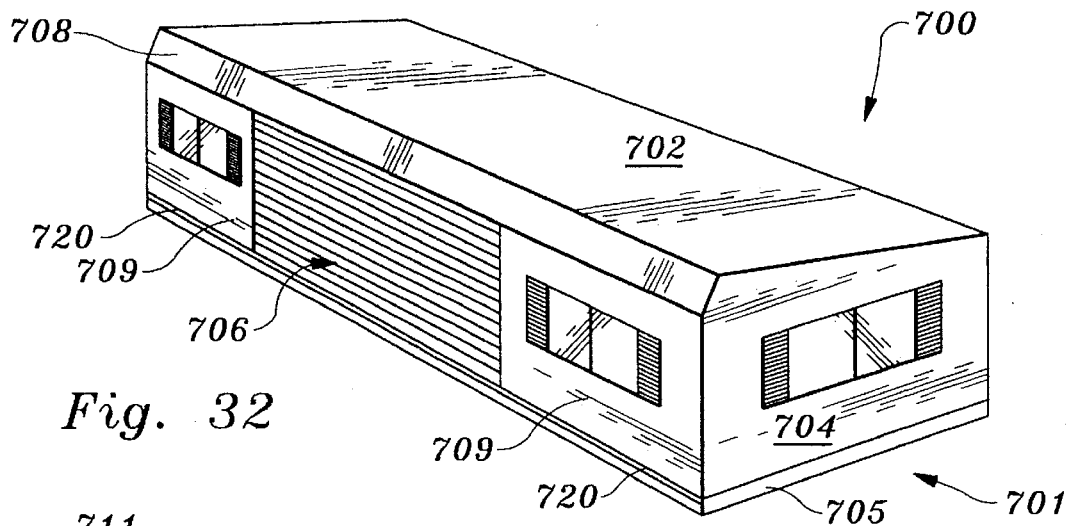
FIG. 32 is a perspective view of a fixed location building structure having two expansion chambers according to this invention.
Figure 33:
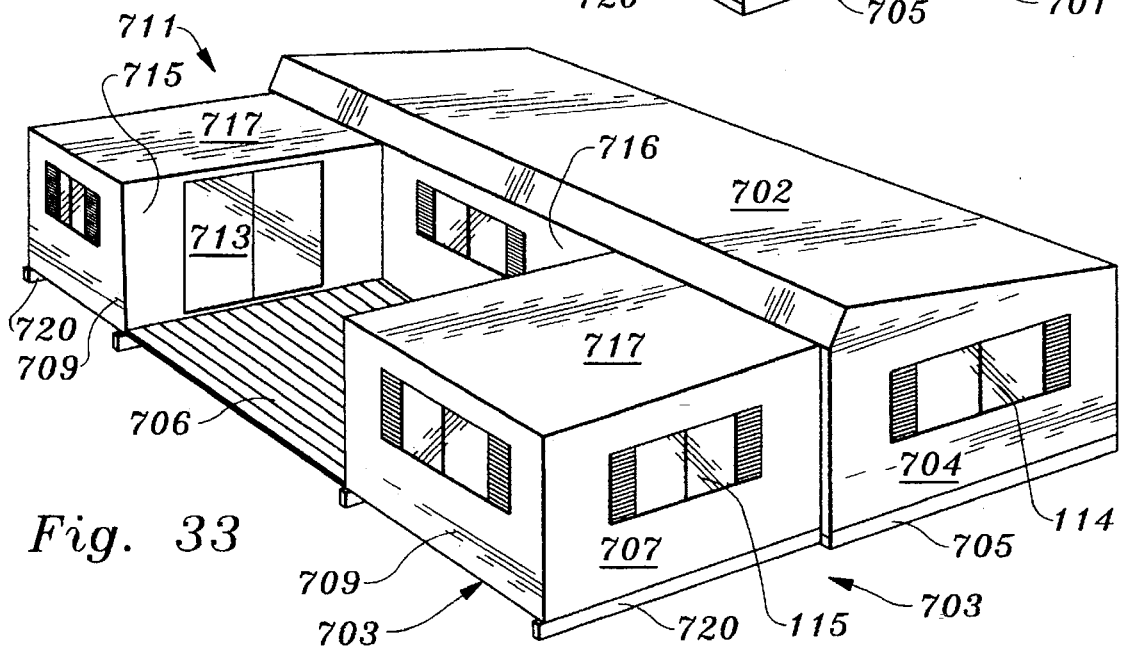
FIG. 33 is a view similar to FIG. 32 showing both chambers in their outward deployed position.
Figure 34:
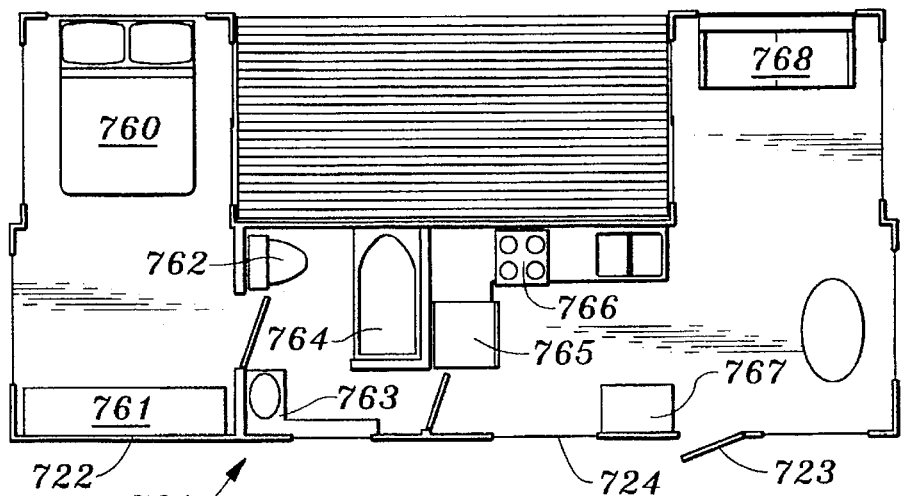
FIG. 34 is a top view of the building structure of FIG. 32 with the roofs of both the main body and the expansion chambers removed.

The discussion all along has been about the use of an expansion chamber either forward, rear or side moving or a combination of such movements in a wheeled vehicle designated as a coach. The embodiment 700 found in FIGS. 32, 33 and 34 illustrates the fact that the "coach" need not be a wheeled vehicle. In point of fact, it can be a semi-permanent structure on a foundation, which would be the alter ego of the main body chassis of a wheeled vehicle.

Here in FIG. 32, the building 701 sits on a foundation such as of poured concrete 705. Building 701 includes a pair of spaced sidewalls 704, a rear wall unseen, primary roof 702 and a hip roof section 708, and a drop down platform 706, which appears to have a series of striations therein for enhanced aesthetics. Drop down platform 706 separates a pair of what appear to be front wall sections 709.

In FIG. 33, the reader notes that in fact element 709 while appearing to be a front wall of the building 701, is in fact the front wall of a moveable chamber 703. This chamber 703 has an open end box configuration and includes a front wall 709, and a pair of spaced sidewalls 707, as well as its own roof section, 717.

Chamber 711, situated on the opposite side of drop down platform 706 is of a similar box configuration, and features an outside sidewall 707, a roof 717, a front wall 709 and a spaced second sidewall 715 which includes a sliding door 713. No criticality is seen to either type of sidewall such that the sliding door can be on the left or right or both of the chambers. Here drop down platform 706 is seen to be in its lowered disposition between the two moveable chambers. A front wall section 716 is seen to extend between the two moveable chambers 703, 705.

Of course none of the four deployable rails are seen in FIG. 32 in their deployed disposition and the casters and motor and chassis previously discussed are also not seen here in this artist rendering. But all of these elements are incorporated, in order to permit the two chambers 703, 705 to move forwardly and rearwardly. Thus reference is again made to FIG. 32 wherein the pair of spaced horizontal bars numbered as elements 720 are recognized as being the front stowed deployable rail of the pair of such rails used on each side of the structure for each of the two moveable chambers. These rails 720 are visible in their deployed disposition in FIG. 33.

FIG. 34 is a top plan view with the roof removed from both of the expansion chambers and the main part of the building 701. In this artist rendering it is seen that such creature comforts as a wardrobe 761, toilet 762, lavatory 763, spa-tub 764, refrigerator 765, stove 766, pantry cabinet 767 and a sofa bed 768 are all to be found, along with countless others too numerous to mention.

Also in this view the rear wall 722 of the structure 701 is seen. This wall 701 includes one or more windows 724 and a door 723 just as would the rear of any other permanent structure.

The operations required to deploy the rails and move the chambers is the same here as in a wheeled vehicle, and as such further discussion is deemed unwarranted.

Figure 35:
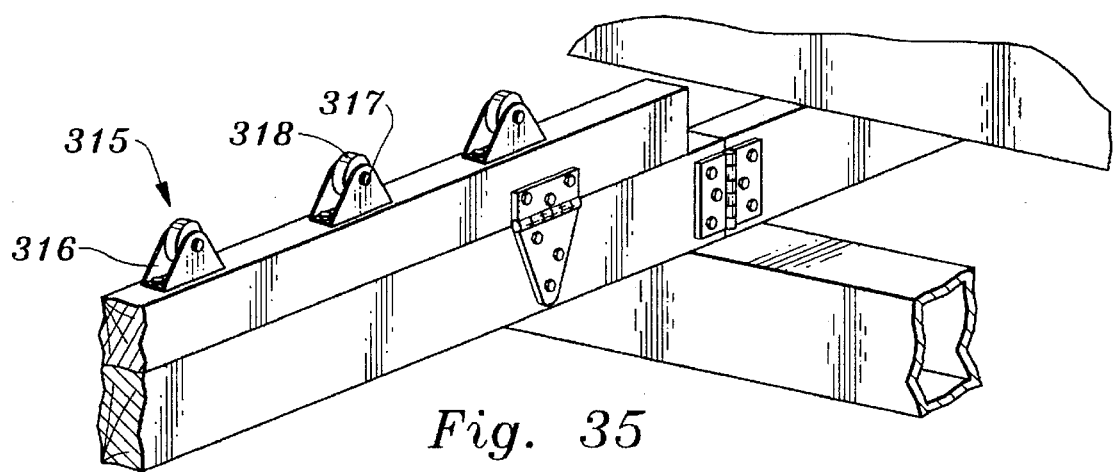
FIG. 35 is a rear perspective view of the deployable rail system of this invention showing an alternate form of a caster motive means for the disposition of the expansion chamber.
Figure 36A:
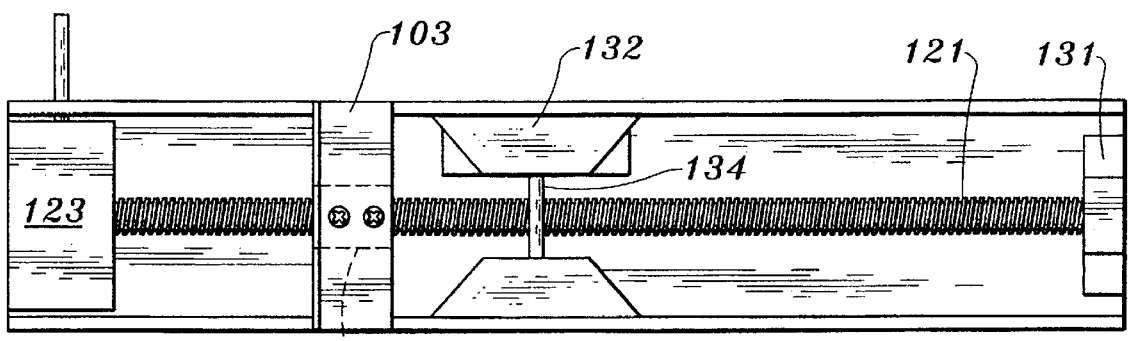
FIGS. 36 A through 36 I illustrate the relative positions of the various drive components during a cycling of the expansion chamber from the stowed i.e., inner position to the expanded outer position.
Figure 36B:
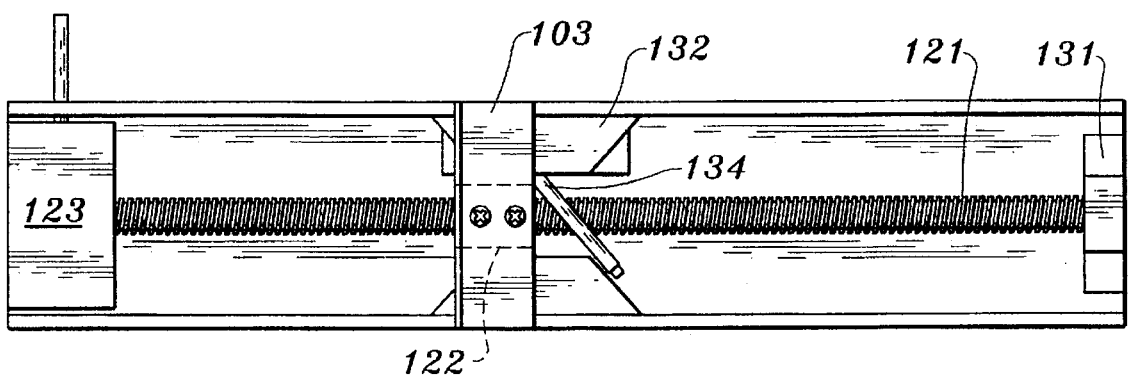
Figure 36C:
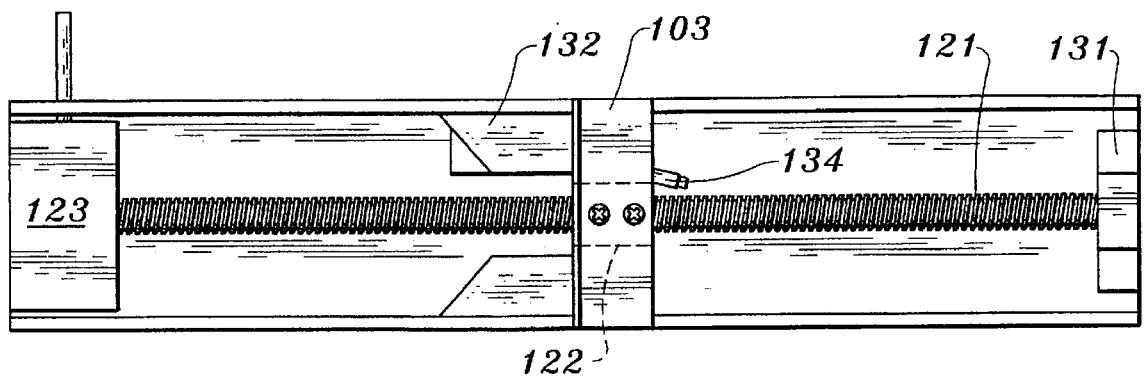
Figure 36D:
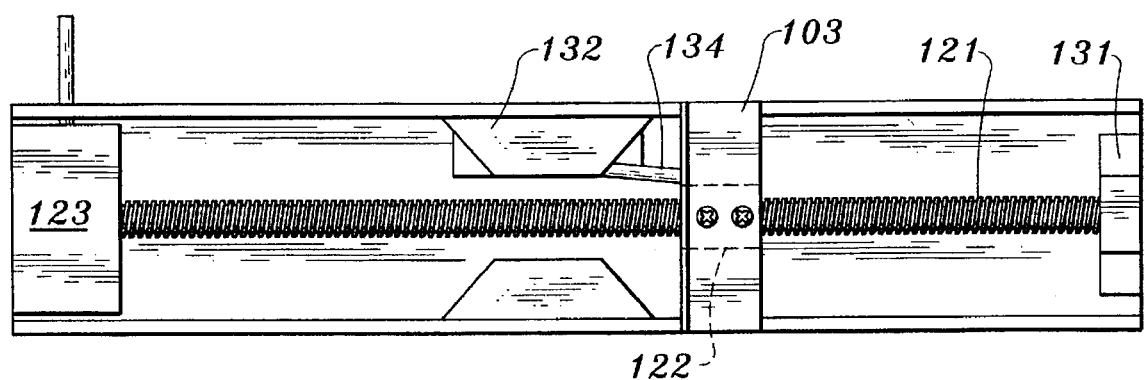
Figure 36E:
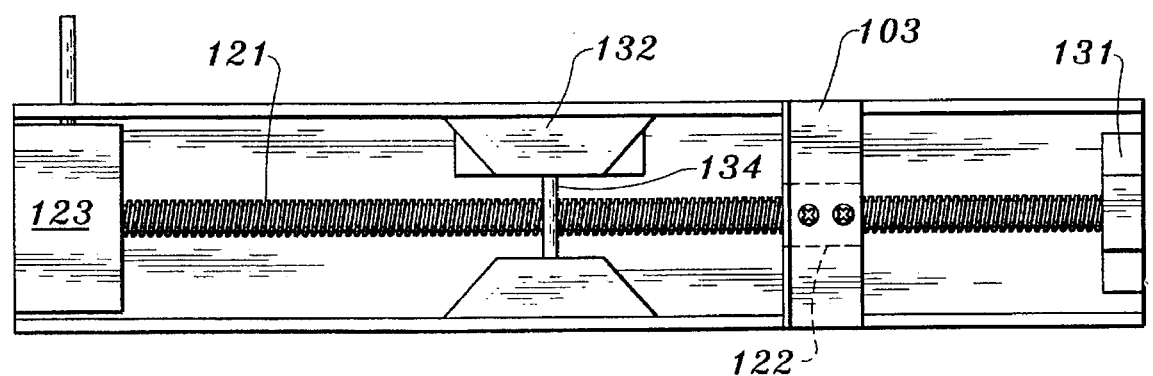
Figure 36F:
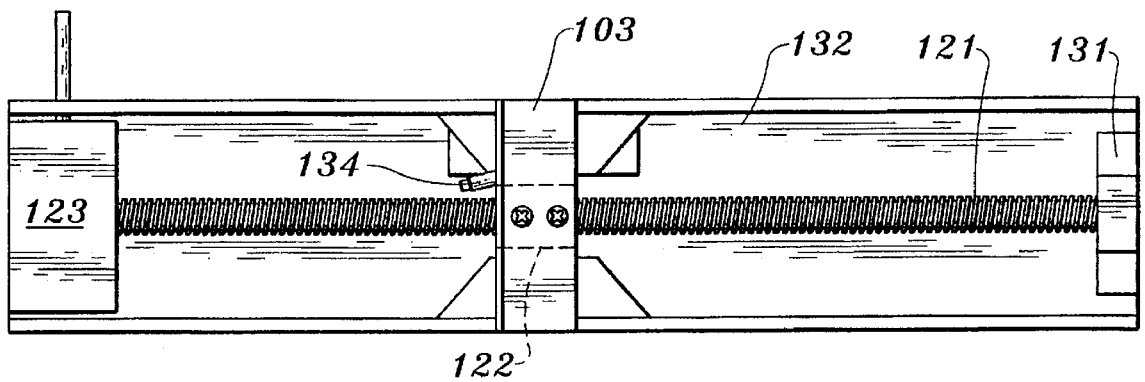
Figure 36G:
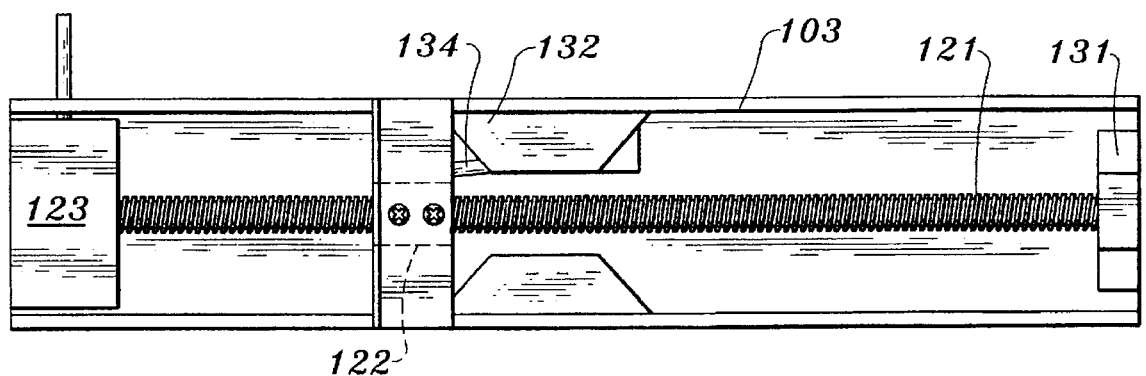
Figure 36H:
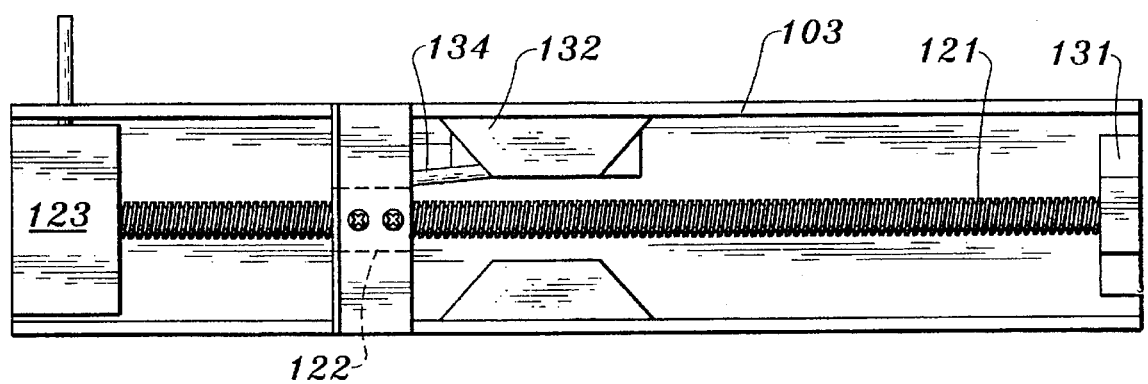
Figure 36I:
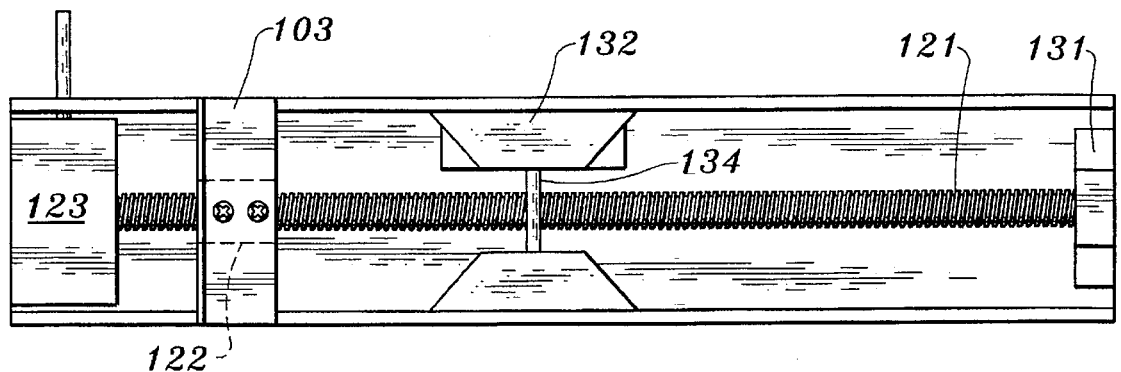

FIG. 35 illustrates a variant in the disposition of the plurality of casters that can be utilized on the pivot rail. In the discussion pertaining to FIG. 38, the caster wheels 116, are held on their axle pins 117 within the confines of channel 114 such that part of the wheel is above and part of the wheel is below the top surface of the pivot rail. In this embodiment the entire caster 315 is disposed above the surface of the pivot rail. Caster 315 includes a mount frame 316 in which the wheel 318 is disposed on a pin 317 within the frame 316. In this embodiment the chamber would move only on these casters, and no V-groove casters would be present since there is no A shaped member on the deployable rail.

The discussion now moves to FIGS. 36 A, B, C, D, E, F, G, H, and I. These represent a series of timed exposures all in sequence of the movement of the acme block aforementioned along the acme rod aforementioned. This is representative of the movement of the entire chamber from its internal at rest to its external in use position.

As the acme block 122, located beneath the flange 103—best seen in FIG. 22—travels along its respective acme rod, 121, it urges the spring 134 out of the way on impact therewith. See FIGS. 36B and C for example. As the block 122 moves along, it traverses the length of the acme rod, corresponding to the movement of the chamber. The spring 134 which is used to prevent flex of the acme rod downwardly due to its long length, usually in the 8 foot range, moves out of the traffic flow temporarily and then returns to its rest position.

It is seen that while only one spring and its retainer system have been disclosed, that it is within the scope of the invention to have 2 or more such moveable springs for extra support of the acme rod. Each such additional spring and it retention system would be substantially the same as has been described heretofore.

The reader should understand that only a de minimis disclosure of the structure has been recited since the invention resides in the specifics of the modes of support and movement of one or more chambers relative to the main body. Thus, it is also within the scope of the invention to utilize full length interior sidewalls to add extra sound insulation and to add to the strength of the overall construction.

It is within the skill of the art to remove the rear wall, reinforce the balance of the coach, add a connector panel at a suitable location on each of the interior walls, and an accompanying interior wall to create the space to receive the sidewalls of the expansion chamber. The balance of the expansion chamber would nest into the main body of the coach in the manner previously described herein.

The reader should also note that the expansion chamber concept of this application can be retrofitted to an existing motor coach, and probably to an existing house after the changes to the front (or the rear) of the building have been engineered. Since the deployable rails are in fact deployed from a stowed position beneath the structure, it is seen that a permanent building must be disposed on some type of foundation and not on a slab to utilize the invention of the is application.

It is seen that I have described a new structure, be it a coach, home or commercial building that can be expanded for use, to add extra "living space", on demand. The apparatus can be used in a vehicle by having wheeled axles, or it can be used in a coach placed on suitable stanchions, which are readily available in the marketplace for permanent placement at a fixed location.

The apparatus as has been shown may include one or more expansion chambers. If the apparatus is a towed vehicle, then expansion chambers may be placed at the forward and at the rear ends thereof. If the coach is to be driveable by the inclusion of a cab and propulsion means, then only a rearwardly positioned expansion chamber may be incorporated into the coach.

It is also to be seen that in all types of structures, that it is possible to have a plurality of expansion chambers, one or more of which moves linearly, and one or more of which moves transversely in the ingress and egress movements.

The term living space as used herein is defined as the volume of the interior of the main body added to the volume of each of said expansion chambers when moved to its expanded in use position. It is to be noted that while the term expanded is used synonymously with "in-use", it is to be seen that the chamber can be utilized in its stowed position as well. Thus in-use really denotes primarily intended use.

I have indicated that the structure,—coach or building—features a living space which has fixed upstanding inner sidewalls and a base, and which preferably has no closing wall at the front and/or rear position at which the respective chamber is disposed. It is also within the scope of the invention to provide a separator—interior wall at this location with a doorway therein, such that the expansion chamber assumes the appearance of a private room segregated from the rest of the structure.

I have at the same time described an expansion chamber which itself can be retrofitted to an existing coach and perhaps with the aide of an architect retrofitted to an existing free standing building, by the carrying out of certain procedural steps, all of which are within the skill of the coach builder, building contractor, or repair person. Thus rather than referring to a coach as the main portion of the invention, the writer will employ the term structure.

While I have disclosed a motor driven ram to operate the movement of the expansion chamber and have placed the controls on the exterior of the coach body, a hand crank could be substituted for a motor to move the expansion chamber. Similarly, if the unit is motorized, the controls could be placed on the inside of the coach at a convenient location. Movement of the chamber(s) within a permanent building such as a house should preferably be by a wall mounted control system.

In view of the fact that the deployable rails move from beneath the main body, it is readily seen that a permanent building must be on an elevated foundation and not on a slab.

Whereas in my previously filed patent application, if a coach were powered, then only one expansion chamber could be employed. Such a limitation is not applicable to this invention, since a wheeled coach could have one rearwardly moving expansion chamber and as many as two side moving ones.

While I have disclosed the use of a plurality of floor segments spaced between longitudinal members of the expansion chassis, it is also within the scope of this invention and within the realm of the skill of the art to utilize a single floor member with the plurality of longitudinal and cross members disposed there beneath.

Since certain changes may be made in the above described apparatus without departing from the scope of the invention herein involved, it is intended that all matter contained in the above description and shown in the accompanying drawings shall be interpreted as illustrative and not in a limiting sense.

I claim:

1. A structure, selected from the group consisting of wheeled and unwheeled coaches and permanent buildings on a foundation, which structure has an interior living space, and which includes at least one expansion chamber, which structure includes a main body having a top wall, and two spaced preferably parallel upright walls, attached normal thereto; and a fixed base, which fixed base is connected to said upright walls;

each of said expansion chambers comprising a box open at one end and having a top wall, a bottom wall and three closure walls, two of which are spaced from and parallel to each other, and an open wall all of which connect the top wall and the bottom wall, the location of the closure walls being dependent on the disposition of the expansion chamber relative to the main body, such that said three closure walls can be any of (a) two spaced sidewalls and a rear wall; (b) two spaced sidewalls and a front wall; (c) spaced front and rear walls and one sidewall;

said expansion chamber being disposed intermediate the main body's spaced upright walls, and between both of said top wall and said fixed base, said expansion chamber being movable in and out with respect to said main body in a telescopic manner, from between the main body's outer and inner sidewalls, and from between both of the top wall and fixed base on a deployable rail system;

the interior living space being defined as the volume of the interior of the main body added to the volume of each of said expansion chambers when moved to its in use position wherein each expansion chamber moves from its first position to its second position on the deployable rail system, which rail system comprises a pair of deployable rails each of which comprises a support bar to which a pivot bar is hingedly attached to pivot 180° from an at rest position to an in use position, said pivot bar extending outwardly along substantially the entire length of said support bar.

2. In the structure of claim 1 wherein each expansion chamber is moved from a stowed inner position to an in use outer position by an electronic means comprising a reversing switch actuated battery powered ram.

3. In the structure of claim 1 wherein each expansion chamber is moved from a stowed inner position to an in use outer position by a hand crank operated ram.

4. In the structure of claim 3 including means to prevent excessive outward movement of the expansion chamber relative to the main body disposed between the expansion chamber and the main body.

5. In the structure of claim 1 wherein the sidewalls of the main body have an exterior side and an interior side and further including at least one roller mounted on the interior side of each main body sidewall sized to permit the rotating section thereof to roll on the adjacent respective sidewall of the expansion chamber.

6. In the structure of claim 5 wherein the structure is a building and said building has two expansion chambers, each of which moves in the same direction from its stowed position to its in use position.

7. In the structure of claim 1 wherein said structure is a coach which includes a superstructure comprising two chassis, a main body chassis and an expansion chassis for each expansion chamber, and said main body chassis contains the deployable rail system.

8. In the structure of claim 7 wherein the structure is a coach, which coach's main body chassis comprises a series of spaced crossmembers connected to spaced channel longitudinal side members, said main body chassis having said deployable rail system hingedly mounted thereto.

9. In the structure of claim 8 wherein the deployable rail system comprises a pair of deployable rails, each of which has a distal and a proximal end and each of which is pivotally mounted at its proximal end to a main body chassis member and wherein each expansion chassis is disposed within said main body for movement on said rail system and is configured as a rectangle having front, and rear cross members connected to at least three spaced longitudinal channel members, and wherein at least one of the longitudinal members has a movement mechanism disposed therein for the egress and ingress of said chamber.

10. In the structure of claim 9 wherein two of the longitudinal channel members of the expansion chassis have portions of a movement mechanism disposed therein thereby defining a dual drive system for the egress and ingress of said chamber.

11. In the structure of claim 9 wherein the expansion chassis further includes a bottom wall defining a floor disposed upon said crossmembers and said longitudinal members.

12. In the structure of claim 11 wherein the movement mechanism comprises a powered gear motor in engagement with an acme rod upon which rides an acme block.

13. In the structure of claim 11 wherein the movement mechanism further includes a gear box disposed within a different longitudinal channel member from said gear motor, but connected both to said motor and to a second acme rod.

14. In the structure of claim 13 wherein the structure is a coach whose upright walls are sidewalls, and both the left sidewall and the right sidewall of each of the main body's sidewalls and those of the chamber have windows in spatial alignment.

15. In the structure of claim 13 wherein the structure is a fixed building whose upright walls are sidewalls, and at least one of the left sidewall and the right sidewall of the main body's sidewalls and those of the chamber have windows in spatial alignment.

16. In the structure of claim 9 further including means to support the deployable rails when in the deployed position.

17. In the structure of claim 9 wherein said movement mechanism comprises a dual drive mechanism, the first of which drives comprises a gear motor connected to an acme rod, which acme rod carries an acme block, said acme block being mounted to the main body of the structure;

and the second drive comprising a gear box mechanically connected to the gear motor, and to a second acme rod which second acme rod carries a second acme block which is also mounted to the main body of the structure.

18. In the structure of claim 7 wherein the expansion chassis comprises a rectangle having front, and rear spaced cross members connected to more than a pair of spaced longitudinal channel members and a floor mounted to all of said members;

and further including one, of a pair of rollers, mounted adjacent two separate longitudinal channel members.

19. In the structure of claim 18 wherein the fixed base of the main body also includes a pair of rollers disposed to make contact with the floor of said expansion chamber.

20. In the structure of claim 1 wherein the rail system further includes on each of the two pivot bars, an A-shaped metal section, extending along the length thereof and welded thereto and designated as a caster rail, and which extends along the entire length of the pivot bar;

and each expansion chamber moves from its first position to its second position on the deployable rail system, on a plurality of V-groove casters rolling on the pivot bars of said deployable rail system.

21. In the structure of claim 1 wherein spaced upright walls are sidewalls and at least one of the sidewalls of the main body includes a window, and the corresponding sidewall of an expansion chamber also includes a window, the window of said chamber being in spatial alignment with the window of said main body when the expansion chamber is in its stowed position such that light can enter the structure.

22. In the structure of claim 21 wherein the structure is a coach and there are two expansion chambers present.

23. In the structure of claim 21 wherein the structure is a building on a foundation and there are two expansion chambers present.

24. In the structure of claim 1 wherein the rail system further includes on each of the two pivot bars an elongated channel which extends inwardly from its top in use surface along its entire length, and disposed within said channel are a plurality of in-line casters, each of which comprises a wheel and an axle pin, and wherein each wheel extends into the channel and above the channel as well;

and each expansion chamber moves from its first position to its second position on the deployable rail system, on the plurality of upstanding casters of said deployable rail system.

25. In the structure of claim 1 wherein the rail system further includes on each of the two pivot bars along its entire length, a plurality of in-line casters, each of which comprises a wheel and an axle pin;

and each expansion chamber moves from its first position to its second position on the deployable rail system, on the plurality of upstanding casters of said deployable rail system.

26. A structure comprising a self-contained motorized coach having an interior living space, which structure, has a cab for controls for the operation of a propulsion system at the forward end of said structure, and which structure includes at least one expansion chamber which one expansion chamber is located at the rear thereof, which structure includes a main body having a top wall, and spaced left and right outer sidewalls, attached normal thereto; said main body also having spaced parallel sidewalls; and a fixed base, which fixed base is connected to said fixed sidewalls, said expansion chamber comprising a box open at one end and having a top wall, two sidewalls, a bottom wall and a rear closure wall connecting the top wall, sidewalls, and the bottom wall, said expansion chamber being disposed intermediate the main body's sidewalls, and between both of said top wall and said fixed base, said expansion chamber being movable in and out with respect to said main body in a telescopic manner, from between the main body's spaced sidewalls, and from beneath both of the top wall and fixed base on a deployable rail system;

and a deployable rail system for the movement of said expansion chamber;

the interior living space being defined as the volume of the interior of the main body added to the volume of each of said expansion chambers when moved to its expanded in use position which rail system comprises a pair of deployable and pivotable rails each of which comprises a pivot bar pivotable 180° from an at rest position to an in use position, and said expansion chamber having an expansion chassis, said expansion chassis having a movement mechanism disposed therein for the egress and ingress of said chamber.

27. A structure comprising a self-contained motorized coach having an interior living space, which structure, has a cab for controls for the operation of a propulsion system at the forward end of said structure, and which structure includes at least one expansion chamber which one expansion chamber is located at one side thereof, which structure includes a main body having a top wall, and spaced left and right outer sidewalls, attached normal thereto; said main body also having spaced parallel sidewalls; and a fixed base, which fixed base is connected to said fixed sidewalls, one of said parallel sidewalls having an opening therein for the ingress and egress of an expansion chamber;

said expansion chamber comprising a box open at one end and having a top wall, a bottom wall, spaced front and rear walls and a side closure wall connecting the top wall, front and rear walls, and the bottom wall, said expansion chamber being disposed along the length of one of the main body's sidewalls, and between both of said top wall and said fixed base, said expansion chamber being movable in and out with respect to said main body in a telescopic manner, from the opening within the main body's sidewall, and from between both of the top wall and fixed base on a deployable rail system;

and a deployable rail system for the movement of said expansion chamber comprising two hingedly mounted deployable arms each of which has a support bar and a pivot bar, the pivot bar pivoting from a stowed position to an in use position on said support bar;

the interior living space being defined as the volume of the interior of the main body added to the volume of said expansion chamber when moved to its expanded in use position.

28. In the structure of claim 27 wherein one wall of the expansion chamber also includes a door therein.

29. In the structure of claim 27 wherein at least one wall of the front, rear and the sidewall of the expansion chamber has a window therein.

30. In the structure of claim 27 further including a movement mechanism for moving the expansion chamber from an inward to an outward disposition, which mechanism comprises a dual drive mechanism, the first of which drives comprises a gear motor connected to an acme rod, which acme rod carries an acme block, said acme block being mounted to the main body of the structure;

and the second drive comprising a gear box mechanically connected to the gear motor, and to a second acme rod which second acme rod carries a second acme block which is also mounted to the main body of the structure.

31. In the structure of claim 27 wherein the rail system further includes on each of the two pivot bars, an A-shaped metal section, extending along the length thereof and welded thereto and designated as a caster rail, and which extends along the entire length of the pivot bar.

32. A towable structure adapted to be pulled by a powered vehicle, said structure having an interior living space, which structure has at least one and no more than two expansion chambers, which structure includes a main body having a top wall, and spaced left and right sidewalls, attached normal thereto; and a fixed base, which fixed base is connected to said sidewalls;

each of said expansion chambers comprising a box having one open wall and having a top wall, two spaced parallel walls, a bottom wall and one closure wall connecting the top wall, the parallel walls and the bottom wall, the location of the closure wall being dependent on the disposition of the expansion chamber relative to the main body, which expansion chamber if located in front of the main body has a front closure wall and if located to the rear of the main body has a rear closure wall, and if located to the side has a side closure wall;

each of said expansion chambers being disposed intermediate the main body's outer and inner sidewalls, and beneath both of said top wall and said fixed base, each of said expansion chambers being movable in and out with respect to said main body in a telescopic manner, from between the main body's top wall and fixed base from a stowed position to an expanded position on a deployable rail system;

the interior living space being defined as the volume of the interior of the main body added to the volume of each of said expansion chambers when moved to its expanded position;

and a deployable rail system comprising two hingedly mounted deployable arms each of which has a support bar and a pivot bar, the pivot bar pivoting from a stowed position to an in use position on said support bar.

33. The towable structure of claim 32 wherein there is one expansion chamber and it is located at the rear of the main body.

34. In the structure of claim 32 further including a movement mechanism for moving the expansion chamber from an inward to an outward disposition, which mechanism comprises a dual drive mechanism, the first of which drives comprises a gear motor connected to an acme rod, which acme rod carries an acme block, said acme block being mounted to the main body of the structure;

and the second drive comprising a gear box mechanically connected to the gear motor, and to a second acme rod which second acme rod carries a second acme block which is also mounted to the main body of the structure.

35. In the expansion chamber of claim 34 wherein the each acme rod of the movement mechanism is about eight feet long, and is supported at the end distant from a gear means by a pillow block.

36. A structure comprising a self-contained motorized coach having an interior living space, which structure, has a cab for controls for the operation of a propulsion system at the forward end of said structure, and which structure includes at least one expansion chamber which one expansion chamber is located at the rear thereof, which structure includes a main body having a top wall, and spaced left and right outer sidewalls, attached normal thereto; said main body also having spaced parallel sidewalls; and a fixed base, which fixed base is connected to said fixed sidewalls, said expansion chamber comprising a box open at one end and having a top wall, two sidewalls, a bottom wall and a rear closure wall connecting the top wall, sidewalls, and the bottom wall, said expansion chamber being disposed intermediate the main body's sidewalls, and between both of said top wall and said fixed base, said expansion chamber being movable in and out with respect to said main body in a telescopic manner, from between the main body's spaced sidewalls, and from beneath both of the top wall and fixed base on a deployable rail system;

and a deployable rail system for the movement of said expansion chamber;

the interior living space being defined as the volume of the interior of the main body added to the volume of each of said expansion chambers when moved to its expanded in use position further including a movement mechanism for moving the expansion chamber from an inward to an outward disposition, which mechanism comprises a dual drive mechanism, the first of which drives comprises a gear motor connected to an acme rod, which acme rod carries an acme block, said acme block being mounted to a main body of the structure;

and the second drive comprising a gear box mechanically connected to the gear motor, and to a second acme rod which second acme rod carries a second acme block which is also mounted to a main body of the structure.

37. In the structure of claim 36 wherein each acme rod of the movement mechanism is about eight feet long, and is supported at the end distant from a gear means by a pillow block.

38. An expansion chamber for retrofit onto a preexisting structure, which structure has outer walls, at least one end wall, a top wall and a base, upon creation of an opening in one wall of said structure for the disposition of said chamber, said expansion chamber comprising a box open at one end and having a top wall, two spaced parallel walls, a bottom wall and one closure wall connecting the top wall, the two parallel walls, and the bottom wall, the location of the closure wall being dependent on the disposition of the expansion chamber relative to the main body, said chamber being adapted for movement in and out with respect to said structure in a telescopic manner from between the structure's pair of outer walls and from between both of the top wall and said base on a deployable rail system further including a movement mechanism for moving the expansion chamber from an inward to an outward disposition, which mechanism comprises a dual drive mechanism, the first of which drives comprises a gear motor connected to an acme rod, which acme rod carries an acme block, said acme block being mounted to a main body of the structure;

and the second drive comprising a gear box mechanically connected to the gear motor, and to a second acme rod which second acme rod carries a second acme block which is also mounted to a main body of the structure.

39. The expansion chamber of claim 38 wherein said chamber has a chassis having a plurality of rollers thereon adapted for movement on the floor of the base of a main body of a pre-existing structure.

40. In the expansion chamber of claim 39 wherein the chamber has a chassis comprising a plurality of spaced longitudinal u-channel members and a floor attached thereto.

41. In the expansion chamber claim 40 wherein two of the longitudinal u-channel members each carry a single V-groove caster, adapted to engage an A-shaped rail.

42. In the expansion chamber of claim 38 wherein the pair of parallel walls are sidewalls.

43. In the expansion chamber of claim 38 wherein the pair of parallel walls are front and rear walls.

* * * * *